(12) United States Patent  (10) Patent No.: US 8,239,541 B2
Gobara et al.  (45) Date of Patent: Aug. 7, 2012

(54) BIDIRECTIONAL CONNECTION SETUP BETWEEN ENDPOINTS BEHIND NETWORK ADDRESS TRANSLATORS (NATS)

(75) Inventors: Kunio Gobara, Osaka (JP); Hajime Maekawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1296 days.

(21) Appl. No.: 10/576,588
(22) PCT Filed: Oct. 29, 2004
(86) PCT No.: PCT/JP2004/016084
§ 371 (c)(1),
(2), (4) Date: Apr. 21, 2006
(87) PCT Pub. No.: WO2005/046143
PCT Pub. Date: May 19, 2005

(65) Prior Publication Data
US 2007/0091798 A1  Apr. 26, 2007

(30) Foreign Application Priority Data
Nov. 7, 2003  (JP) .................................. 2003-378289
Apr. 16, 2004  (JP) .................................. 2004-121592

(51) Int. Cl.
G06F 15/16  (2006.01)
(52) U.S. Cl. .......................... 709/227; 709/228; 709/249
(58) Field of Classification Search .................. 709/227, 709/228, 249
See application file for complete search history.

(56) References Cited

U.S. PATENT DOCUMENTS
| | | | |
|---|---|---|---|
| 7,676,579 B2 | 3/2010 | Harris et al. | |
| 2004/0133692 A1 | 7/2004 | Blanchet et al. | |
| 2004/0139228 A1* | 7/2004 | Takeda et al. | 709/245 |
| 2004/0153858 A1 | 8/2004 | Hwang | |
| 2004/0190549 A1 | 9/2004 | Huitema | |
| 2006/0075127 A1* | 4/2006 | Juncker et al. | 709/229 |
| 2006/0288103 A1* | 12/2006 | Gobara et al. | 709/224 |
| 2008/0215669 A1 | 9/2008 | Gaddy et al. | |
| 2009/0240821 A1* | 9/2009 | Juncker et al. | 709/228 |

(Continued)

FOREIGN PATENT DOCUMENTS
JP  2004-180003  6/2004
JP  2004-304317  10/2004

OTHER PUBLICATIONS

Bidirectional Peer-to-Peer Communication with Interposing Firewalls and NATs, Peer-toPeer Working Group, www.p2pwg.org, Revision 0.095, Aug. 17, 2001.

(Continued)

*Primary Examiner* — Jeffrey Nickerson
(74) *Attorney, Agent, or Firm* — RatnerPrestia

(57) ABSTRACT

A first information processor transmits a bubble packet to a port assigned after assignment of specified port from reference port in a second communication control unit, a server detects the position of the bubble packet transmitting port in a first communication control unit used in transmission of this bubble packet, and a second information processor transmits a reply packet to the detected bubble port transmitting port. In this configuration, the invention presents a communication system capable of establishing more securely communication between plural information processors for communicating by way of communication control unit (NAT). In this configuration, the invention presents a communication system capable of establishing more securely communication between plural information processors for communicating by way of communication control unit (NAT).

22 Claims, 26 Drawing Sheets

U.S. PATENT DOCUMENTS

2012/0036192 A1     2/2012    Abuan et al.
2012/0036193 A1     2/2012    Abuan et al.
2012/0042027 A1     2/2012    Abuan et al.

OTHER PUBLICATIONS

US Office Action for U.S. Appl. No. 11/510,487, filed Mar. 4, 2010, Panasonic Corporation.
International Search Report for application No. PCT/JP2004/016084 dated Feb. 8, 2005.
Takuya Oikawa, "IPv6style: Advanced Networking Pack for Windows XP Daikaibo", <URL: //www.ipv6style.jp/jp/tryout/20030929/20030929_p.shtml>, Sep. 29, 2003 (with English translation).
"The Cable Guy—2003 Nen 4 Gatsu: Windows XP Peer-to-Peer Update No. IPv6 Kino", <URL: h_t_t_p_:_/_/www.microsoft.com/japan/technet/community/columns/cableguy/cg0403.mspx>, Apr. 2003 (with English translation).
D.Yon, Connection-Oriented Media Transport in SDP, Online, Mar. 2003, <URL: http://www.ietf.org/internet-drafts/draft-ietf-mmusic-sdp-comedia-05.txt>.
Y. Takeda, Symmetric NAT Traversal using STUN, Online, Jun. 2003, <URL: http://www.cs.cornell.edu/projects/stunt/draft-takeda-nat-traversal-00.txt>.
J. Rosenberg, J. Weinberger, C. Huitema, R. Many "STUN—Simple Traversal of User Datagram Protocol (UDP) Through Network Address Translators (NATs)", Online, Mar. 2003, Network Working Group Request for Comments: 3489, <URL: http://www.ietf.org/rfc/rfc3489.txt>.
Office Action for U.S. Appl. No. 11/510,487, filed Aug. 17, 2010.
Supplementary Partial European Search Report for EP 04 79 3192 dated May 24, 2011.
B.Ford, M.I.T., P. Srisuresh, Caymas Systems, D.Kegel, KEGEL.COM, Peer-to-Peer (P2P) communication across middleboxes, draft-ford-midcom-p2p-01.txt, Oct. 1, 2003.
C. Huitema, Microsoft, Teredo: Tunneling IPv6 over UDP through NATs, draft-huitema-v6ops-teredo-oo.txt, Jun. 6, 2003.
Notice of Allowance for U.S. Appl. No. 11/510,487 dated May 3, 2012.
Office Action for U.S. Appl. No. 11/510,487, filed Jan. 4, 2012.

\* cited by examiner

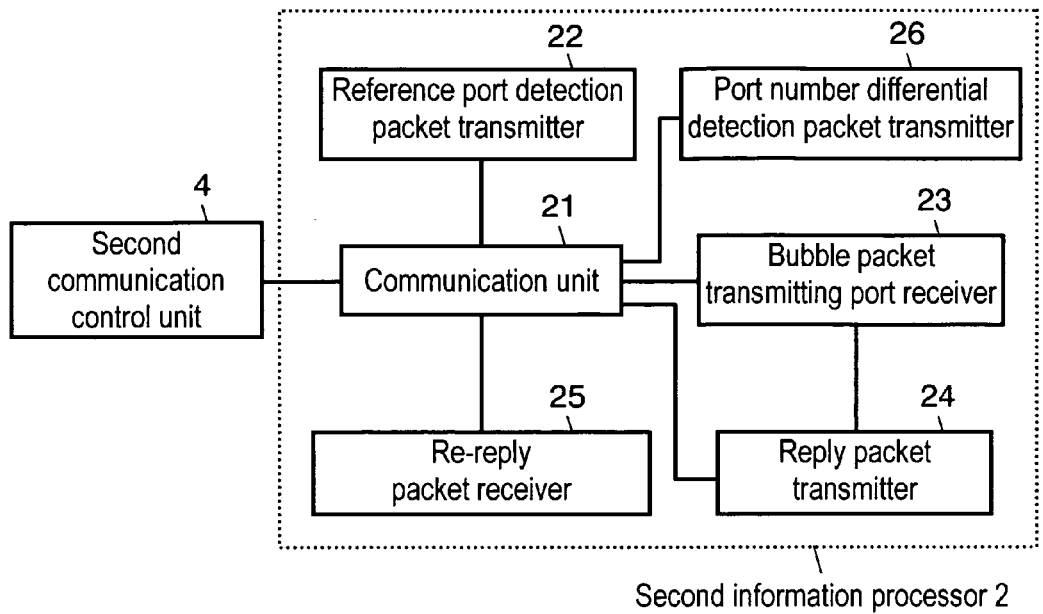
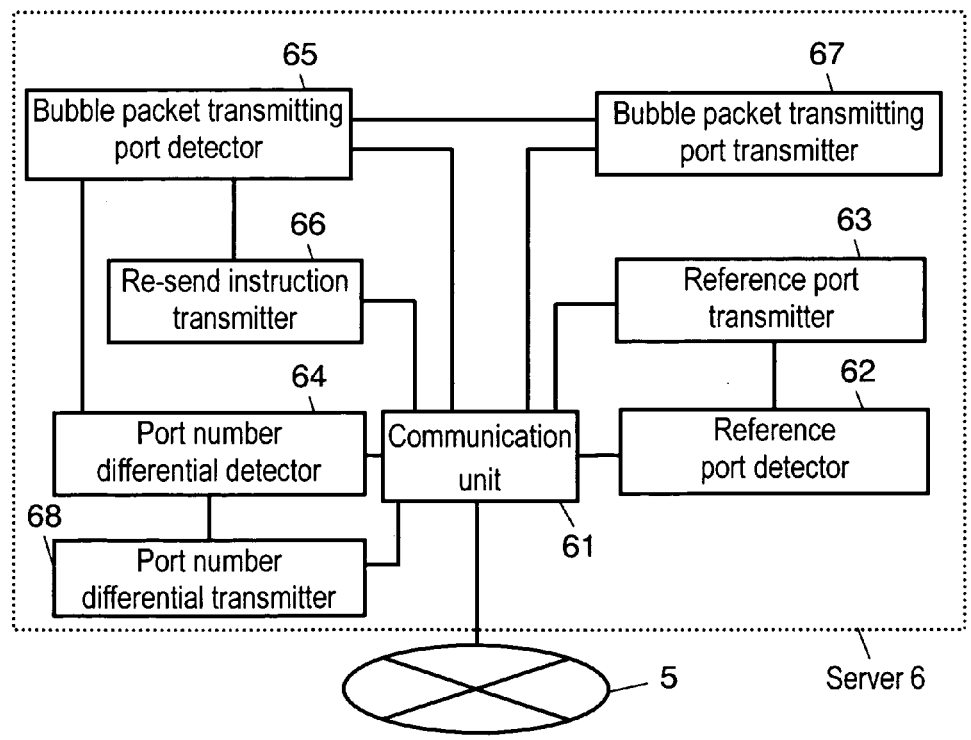

FIG. 17

| Transmission side \ Reception side | O | F | R | PR | Sa | AS | Sc | Sd | Se | PS |
|---|---|---|---|---|---|---|---|---|---|---|
| O | ◎ | ◎ | ◎ | ◎ | ◎ | ◎ | ◎ | ◎ | ◎ | ◎ |
| F | ◎ | ◎ | ◎ | ◎ | ◎ | ◎ | ◎ | ◎ | ◎ | ◎ |
| R | ◎ | ◎ | ◎ | ◎ | ◎ | ◎ | ◎ | ◎ | ◎ | ◎ |
| PR | O | O | O | O | O | O | O | O | O | O |
| Sa | ◎ | ◎ | ◎ | ◎ | ◎ | ◎ | ◎ | ◎ | ◎ | ◎ |
| AS | ◎ | ◎ | ◎ | ◎ | ◎ | ◎ | ◎ | ◎ | ◎ | ◎ |
| Sc | O | O | O | O | O | O | O | O | O | O |
| Sd | ◎ | ◎ | ◎ | O | ◎ | ◎ | O | ◎ | ◎ | O |
| Se | ◎ | ◎ | ◎ | O | ◎ | ◎ | O | ◎ | ◎ | O |
| PS | O | O | O | O | O | O | O | O | O | O |

O : Connection enabled if position of bubble packet transmitting port can be detected and reply packet is sent by using target port for transmitting bubble packet ◎ : Connection enabled if position of bubble packet transmitting port can be detected O : Open NAT
F : Full Cone NAT
R : Restricted NAT
PR : Port Restricted NAT
Sa : Symmetric NAT A
AS(Sb) : Address Sensitive Symmetric NAT
Sc : Symmetric NAT C
Sd : Symmetric NAT D
Se : Symmetric NAT E
PS(Sf) : Port Sensitive Symmetric NAT

| Filter rule / Port assigning rule | No Filter | AS Filter | PS Filter |
|---|---|---|---|
| Cone | Full Cone | Restricted Cone | Port Restricted Cone |
| AS | Symmetric(a) | AS NAT Symmetric(b) | Symmetric(c) |
| PS | Symmetric(d) | Symmetric(e) | PS NAT Symmetric(f) |

FIG. 34 PRIOR ART

| Transmission side \ Reception side | F NAT | R NAT | PR NAT | AS NAT | PS NAT |
|---|---|---|---|---|---|
| F NAT | O * 1 | O * 1 | O * 1 | O * 2 | O * 2 |
| R NAT | O * 1 | O * 1 | O * 1 | O * 2 | O * 2 |
| PR NAT | O * 1 | O * 1 | O * 1 | O * 3 | O * 3 |
| AS NAT | O * 1 | O * 1 | O * 3 | O * 3 | O * 3 |

O : Connection enabled
× : Connection disabled

BIDIRECTIONAL CONNECTION SETUP BETWEEN ENDPOINTS BEHIND NETWORK ADDRESS TRANSLATORS (NATS)

This application is a U.S. National Phase Application of PCT International Application PCT/JP2004/016084.

TECHNICAL FIELD

The present invention relates to communication system or the like for establishing communications between plural information processors.

BACKGROUND ART

First, classification of NAT (network address translation) is explained. The NAT includes the transmission port assigning rule and reception filter rule, and the NAT is classified according to their combination. The transmission port assigning rule is divided into a cone type in which, not depending on the packet destination (IP address, port), when the port of NAT local side (for example, LAN side) information processor and the IP address are the same, the port of the global side (for example, the Internet or WAN side) assigned to the NAT is the same, an address sensitive type in which a new port is assigned for each packet destination address, and a port sensitive in which a new port is assigned for each destination port of packet. The reception filter rule for judging possibility of reception of packet from the local side to the port transmitting the packet from the NAT local side is divided into an address sensitive filter for receiving the packet only from the address transmitting the packet from the port, a port sensitive filter for receiving the packet only from the port transmitting the packet from the port, and no filter having no filter. By combining the transmission port assigning rule and reception filter rule, the NAT can be classified into the following nine types (see FIG. 32).

Full cone NAT (F NAT): Transmission port assigning rule of cone type, and reception port filter rule of no filter.

Restricted cone NAT (R NAT): Transmission port assigning rule of cone type, and reception port filter rule of address sensitive filter.

Port restricted cone NAT (PR NAT): Transmission port assigning rule of cone type, and reception port filter rule of port sensitive filter.

Symmetric (a) NAT (Sa NAT): Transmission port assigning rule of address sensitive type, and reception port filter rule of no filter.

Address sensitive symmetric NAT (AS NAT or Sb NAT): Transmission port assigning rule of address sensitive type, and reception port filter rule of address sensitive filter.

Symmetric (c) NAT (Sc NAT): Transmission port assigning rule of address sensitive type, and reception port filter rule of address sensitive type filter.

Symmetric (d) NAT (Sd NAT): Transmission port assigning rule of port sensitive type, and reception port filter rule of port sensitive type filter.

Symmetric (e) NAT (Se NAT): Transmission port assigning rule of port sensitive type, and reception port filter rule of address sensitive type filter.

Port sensitive symmetric NAT (PS NAT or Sf NAT): Transmission port assigning rule of port sensitive type, and reception port filter rule of port sensitive filter.

In the NAT communication, it has been proposed to establish communications between PC1 and PC2 without using server as shown in FIG. 33.

This technology is disclosed, for example, by D. Yon (Connection-Oriented Media Transport in SDP, Online, March 2003, [searched Sep. 29, 2003], Internet <URL: http://www.ietf.org/internet-drafts/draft-ietf-mmusic-sdp-comedia-05.txt>, hereinafter called non-patent reference 1), or Y. Takeda (Symmetric NAT Traversal using STUN, Online, June 2003, [searched Mar. 25, 2004], Internet <URL: http://www.cs.cornell.edu/projects/stunt/draft-takeda-nat-traversal-00.txt>, hereinafter called non-patent reference 2). It is also reported by J. Rosenberg, J. Weinberger, C. Huitema, R. Mahy (STUN—Simple Traversal of User Datagram Protocol (UDP) Through Network Address Translators (NATs), Online, March 2003, Network Working Group Request for Comments: 3489, [searched Mar. 24, 2004], Internet <URL: http://www.ietf.org/rfc/rfc3489.txt>, hereinafter called non-patent reference 3).

In this case, probably, there is a combination of NATs unable to establish communications. In FIG. 40, when communicating from PC1 of information processor connected to NAT1 local side to PC2, let us call NAT1 as sending side NAT, and NAT2 as receiving side NAT. Hence, combination of NATs capable of establishing communications between PC1 and PC2 is as shown in FIG. 34.

In FIG. 34, connection of *1 has been known hitherto, connection of *2 is disclosed in non-patent reference 1, and connection of *3 is disclosed in non-patent reference 2. Even in the combination of NATs capable of establishing communications, connection of *3 involves an uncertainty because communications cannot be established unless the port number differential of NAT is known and the position of the latest port of receiving side NAT is known.

In the combinations in FIG. 34, cases of using Sa NAT or Sc to Se NAT are not included, but even in such NAT cases, it is desired to establish peer-to-peer communication by way of NAT (for example, communication between PC1 and PC2 in FIG. 33).

As prior conditions for establishing communications between information processors, it is desired to detect securely the position of ports of NAT passing through the bubble packet (the packet sent in order to leave communication record in the NAT) transmitted from one information processor.

DISCLOSURE OF THE INVENTION

It is hence an object of the invention to present communication system or the like capable of securely establishing communications between plural information processors for communicating by way of a communication control unit for controlling the communications.

It is other object of the invention to present communication system or the like capable of detecting the range of ports in the communication control unit allowing to pass the bubble packet transmitted from the information processor.

To achieve the object, the first information processor of the invention is a first information processor communicating with a second information processor by way of a first communication control unit for controlling the communication of the first information processor and a second communication control unit for controlling the communication of the second information processor, and it includes a reference port receiver for receiving reference port information showing the position of the reference port as the port in the second communication control unit as the reference of target of transmission of bubble packet sent for leaving the transmission record in the first communication unit, a bubble packet transmitter for sending the bubble packet to the second communication control unit by way of the first communication control unit, a detection packet transmitter for sending a port detection packet for detecting the position of bubble packet transmitting port as the port of the first communication control unit used in transmission of the bubble packet, and a reply packet receiver for receiving a reply packet sent from the second information processor by way of the second communication control unit, to the bubble packet transmitting port.

In this configuration, transmission of bubble packet on the basis of reference port information, and reception of reply packet sent to the bubble packet transmitting port detected by using the port detection packet can be achieved, and communication between the first information processor and second information processor can be established.

The first information processor of the invention is also a first information processor communicating with a second information processor by way of a first communication control unit for controlling the communication of the first information processor and a second communication control unit for controlling the communication of the second information processor, in which the first communication control unit receives a bubble packet for leaving transmission record in the second communication unit from the second information processor by way of the second communication unit, and includes a reference port detection packet transmitter for sending a reference port detection packet for detecting the position of reference port as the port in the first communication control unit as the reference of target of transmission of the bubble packet, a bubble packet transmitting port receiver for receiving bubble packet transmitting port information showing the position of bubble packet transmitting port as the port of the second communication control unit used in transmission of the bubble packet from the second information processor, and a reply packet transmitter for sending a reply packet to the bubble packet transmitting port showing the bubble packet transmitting port information.

In this configuration, the reply packet can be sent to the bubble packet transmitting port leaving the transmission record by transmission of bubble packet, communication between the first information processor and second information processor can be established.

The server of the invention is a server for establishing communication between the a information processor and a second information processor by way of a first communication control unit for controlling communication of the first information processor and a second communication control unit for controlling communication of the second information processor, and it includes a reference port detector for receiving a reference port detection packet sent from the second information processor by way of the second communication control unit, in order to detect the position of the reference port as the port in the second communication control unit as the reference of target of transmission of bubble packet sent from the first information processor for leaving transmission record in the first communication control unit, and detecting the position of the reference port on the basis of the reference port detection packet, a reference port transmitter for sending the reference port information showing the position of the reference port detected by the reference port detector to the first information processor, a bubble packet transmitting port detector for receiving the port detection packet sent from the first information processor, in order to detect the position of the bubble packet transmitting port as the port in the first communication control unit used in transmission of bubble packet from the first information processor to the second communication control unit, and detecting the position of the bubble packet transmitting port on the basis of the port detection packet, and a bubble packet transmitting port transmitter for sending bubble packet transmitting port information showing the position of the bubble packet transmitting port detected by the bubble packet transmitting port detector to the second information processor.

In this configuration, the position of reference port in the second communication control unit can be detected and noticed to the first information processor, and the position of bubble packet transmitting port can be detected and noticed to the second information processor.

The server of the invention is also a server for establishing communication between the first information processor and second information processor by way of the first communication control unit for controlling communication of the first information processor and the second communication control unit for controlling communication of the second information processor, and it includes a reference port detector for receiving a reference port detection packet sent from the second information processor by way of the second communication control unit, in order to detect the position of the reference port as the port in the second communication control unit as the reference of target of transmission of bubble packet sent from the first information processor for leaving transmission record in the first communication control unit, and detecting the position of the reference port on the basis of the reference port detection packet, a reference port transmitter for sending the reference port information showing the position of the reference port detected by the reference port detector to the first information processor, a detector for detecting port number for receiving a port detection packet sent from the first information processor, in order to detect the position of the bubble packet transmitting port as the port in the first communication control unit used in transmission of bubble packet from the first information processor to the second communication control unit, and detecting the position of the port in the first communication control unit allowing to pass the port detection packet on the basis of the port detection packet, and a port number information transmitter for port differential detection for sending the port differential information showing the position of the port detected by the detector for detecting port number to the first information processor.

In this configuration, the position of reference port in the second communication control unit can be detected and noticed to the first information processor, and the position of the first communication control unit allowing to pass the port detection packet can be detected and noticed to the first information processor.

The communication system of the invention is a communication system comprising an information processor, a communication control unit for controlling the communication of the information processor, and a server, in which the information processor includes a bubble packet transmitter for sending a bubble packet for leaving transmission record in the communication control unit by way of the communication control unit, and a detection packet transmitter for sending a port detection packet used in detection of position of bubble packet transmitting port as the port in the communication control used in transmission of bubble packet, to the server, before and after transmission of bubble packet by the bubble packet transmitter.

In this configuration, by the port detection packet sent from the information processor, the position of the bubble packet transmitting port can be detected. It can be detected either in the server or in the information processor, or in other device. Using the position of the detected bubble packet transmitting port, the packet is sent to this bubble packet transmitting port from other device, and hence this packet is received in the information processor.

BRIEF DESCRIPTION OF THE DRAWINGS

FIG. 3 is a block diagram of configuration of second information processor in the preferred embodiment.

FIG. 4 is a block diagram of configuration of server in the preferred embodiment.

FIG. 17 is a diagram of combination of characteristics of communication control units that can be connected in the preferred embodiment.

FIG. 34 is a diagram showing combinations of conventional NATs that can be connected.

DETAILED DESCRIPTION OF THE PREFERRED EMBODIMENTS

Preferred Embodiment 1

A communication system in preferred embodiment 1 of the invention is described while referring to the accompanying drawings.

Figure 1:
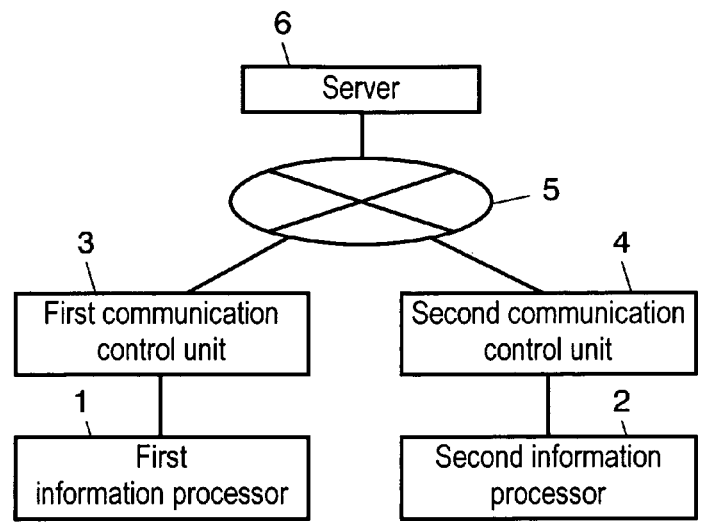
FIG. 1 is a block diagram of configuration of communication system in preferred embodiment 1 of the invention.

FIG. 1 is a block diagram of configuration of communication system in the preferred embodiment. In FIG. 1, the communication system in the preferred embodiment comprises first information processor 1, second information processor 2, first communication control unit 3, second communication control unit 4, and server 6. First communication control unit 3, second communication control unit 4, and server 6 are connected by way of wired or wireless communication network 5. Communication network 5 is, for example, the Internet.

In FIG. 1, first information processor 1 and second information processor 2 are connected respectively to first communication control unit 3 and second communication control unit 4, but other devices may be also connected to first communication control unit 3 and second communication control unit 4.

In the preferred embodiment, first information processor 1 is supposed to operate as transmission side information processor, and second information processor 2 as reception side information processor. Herein, the transmission side information processor refers to the side requesting communication (connection) when establishing communication between first information processor 1 and second information processor 2 (in other words, the bubble packet transmitting side). On the other hand, the reception side information processor refers to the information processor at the opposite side, that is, the side receiving request of communication (in other words, the reply packet transmitting side to the bubble packet). The bubble packet and reply packet are described later.

Figure 2:
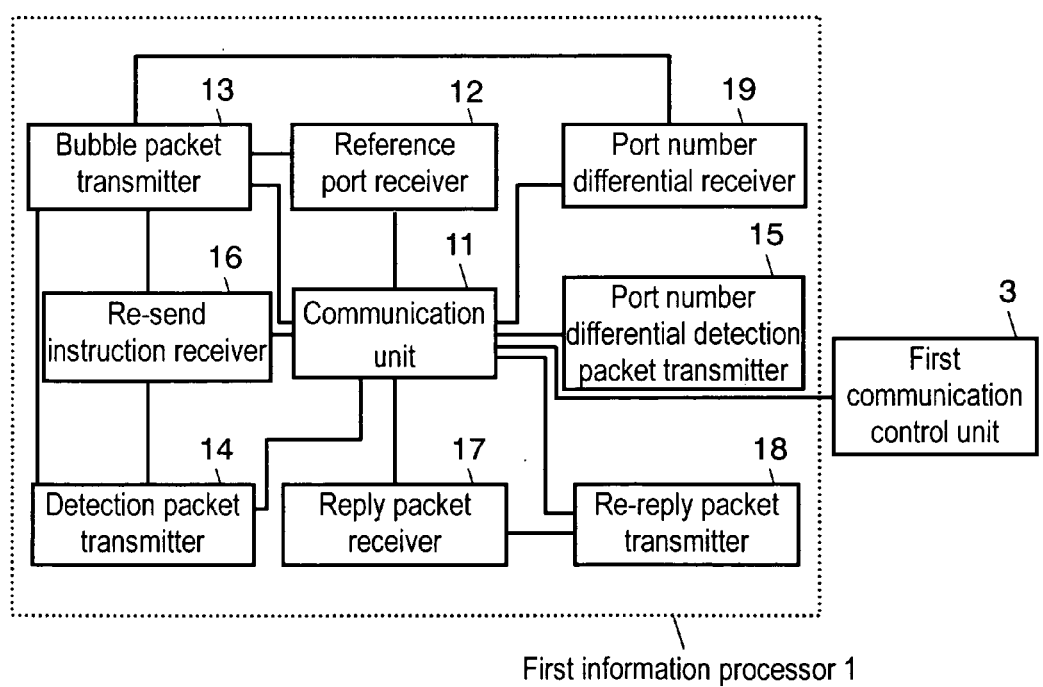
FIG. 2 is a block diagram of configuration of first information processor in the preferred embodiment.

FIG. 2 is a block diagram of configuration of first information processor 1. In FIG. 2, first information processor 1 comprises communication unit 11, reference port receiver 12, bubble packet transmitter 13, detection packet transmitter 14, port number differential detection packet transmitter 15, resend instruction receiver 16, reply packet receiver 17, re-reply packet transmitter 18, and port number differential receiver 19.

Communication unit 11 communicates between bubble packet transmitter 13 or other internal constituent elements in first information processor 1 and first communication control unit 3.

Reference port receiver 12 receives the reference port information showing the position of reference port. The reference port is a specified port in second communication control unit 4, and is the port as reference of the port of target of bubble packet transmission (target port for transmitting bubble packet). To receive the reference port information is to receive, for example, reference port information. The bubble packet is described below.

Bubble packet transmitter 13 transmits a bubble packet to second communication control unit 4 by way of communication unit 11 and first communication control unit 3. The bubble packet is transmitted on the basis of the reference port information received in the reference port receiver 12. More specifically, in second communication control unit 4, the bubble packet is transmitted to the target port for transmitting bubble packet which is the port assigned after assignment of specified port from the reference port in second communication control unit 4. The target port for transmitting bubble packet is, for example, a port of which port interval with the reference port is M times of port number differential (M being an integer of 1 or more) in second communication control unit 4. For example, when ports are assigned so as to increase the port numbers, the target port for transmitting bubble packet is a greater port number than the reference port. The port number differential in second communication control unit 4 is indicated by port differential information received in port number differential receiver 19 described later. The bubble packet is a packet intended to leave transmission record in first communication unit 3 in order to establish communication between first information processor 1 and second information processor 2. Herein, to establish communication is to start peer-to-peer communication between first information processor 1 and second information processor 2 without resort to server 6. To leave transmission record is to assign a port (open a port) for receiving a reply packet described below in first communication control unit 3. The bubble packet may contain certain information or no information. The bubble packet is transmitted by connection less protocol, such as UDP (user datagram protocol).

Detection packet transmitter 14 sends a port detection packet to server 6. This port detection packet is used for detecting the position of bubble packet transmitting port. The bubble packet transmitting port is a port of first communication control unit 3 used in transmission of bubble packet. This port detection packet is transmitted before the bubble packet is transmitted and/or after the bubble packet is transmitted. In this preferred embodiment, the port detection packet is transmitted before and after transmission of bubble packet. The port detection packet is transmitted by UDP or TCP (transmission control protocol). The port detection packet may contain certain information or no information.

Port number differential detection packet transmitter 15 sends a port number differential detection packet used in detection of port number differential in first communication control unit 3 to server 3 by way of first communication control unit 3. The port number differential is the interval of ports used (assigned) continuously. For example, when the port number differential is 1, the port used next to port number 20000 is a port of port number 20001. Or, when the port number differential is 2, the port used next to port number 20000 is a port of port number 20002. The port number differential detection packet may contain certain information or no information.

Re-send instruction receiver 16 receives a re-send instruction. The re-send instruction is an instruction for re-sending bubble packet and port detection packet. The re-send instruction is received, for example, by reception of communication. When the re-send instruction receiver 16 receives the re-send instruction, the detection packet transmitter 14 and bubble packet transmitter 13 transmit the port detection packet and bubble packet again.

Reply packet receiver 17 receives the reply packet sent from second information processor 2 by way of second communication control unit 4. The reply packet is transmitted to the bubble packet transmitting port. The reply packet is received, for example, by reception of communication. The reply packet may contain certain information or no information.

Re-reply packet transmitter 18 sends a re-reply packet when reply packet is received in reply packet receiver 17. The re-reply packet is sent to the port of second communication control unit 4 used in transmission of reply packet. The re-reply packet is transmitted, for example, by UDP. The re-reply packet may contain certain information or no information.

Port number differential receiver 19 receives the port differential information sent from server 6. The port differential information is the information showing the port number differential in second communication control unit 4.

FIG. 3 is a block diagram of configuration of second information processor 2. In FIG. 3, second information processor 2 comprises communication unit 21, reference port detection packet transmitter 22, bubble packet transmitting port receiver 23, reply packet transmitter 24, re-reply packet receiver 25, and port number differential detection packet transmitter 26.

Communication unit 21, like communication unit 11, communicates between reference port detection packet transmitter 22 or other internal constituent elements in second information processor 2 and second communication control unit 4.

Reference port detection packet transmitter 22 transmits the reference port detection packet for detecting the position of reference port to server 6. This reference port is the latest port (the most newly assigned port) at the moment of transmission of reference port detection port, out of the ports assigned in second communication control unit 4. That is, by sending this reference port detection packet, the position of the latest port assigned in second communication control unit 4 can be detected by server 6. The reference port detection packet is transmitted by UDP or TCP. The reference port detection packet may contain certain information or no information.

Bubble packet transmitting port receiver 23 receives bubble packet transmitting port information. The bubble packet transmitting port information is the information showing the position of bubble packet transmitting port, and, for example, the position of bubble packet transmitting port is indicated by port number of bubble packet transmitting port. The bubble packet transmitting port is received, for example, by reception of communication.

Reply packet transmitter 24 transmits reply packet to bubble packet transmitting port in first communication control unit 3. The position of this bubble packet transmitting port is indicated by the bubble packet transmitting port information received in bubble packet transmitting port receiver 23. The reply packet is sent by using different number N (N being an integer of 2 or more) of ports of second communication control unit 4. The N number of ports are ports newly assigned in second communication control unit 4 at the time of transmission of reply packet. The value of N is the number of ports (a) that can be assigned from the reference port to other port transmitting the bubble packet (target port for transmitting bubble packet) in second communication control unit 4. That is, at the time of transmission of reply packet, unless the target port for transmitting bubble packet has been already used in other device, by transmitting a reply packets, the reply packet can be transmitted by using the target port for transmitting bubble packet. The reply packet is transmitted, for example, by UDP. The reply packet may contain certain information or no information.

Re-reply packet receiver 25 receives the re-reply packet sent from first information processor 1. This re-reply packet is sent to the port of second communication control unit 4 used in transmission of reply packet, and is received in second information processor 2. Depending on the type of NAT used in first communication control unit 3 and second communication control unit 4, when first information processor 1 receives the reply packet, communication between first information processor 1 and second information processor 2 may be established, or only when re-reply packet is received in second information processor 2, communication between first information processor 1 and second information processor 2 may be established.

Port number differential detection packet transmitter 26 transmits the port number differential detection packet for detecting the port number differential in second communication control unit 4 to server 6 by way of second communication control unit 4. The port number differential detection packet may contain certain information or no information.

First communication control unit 3 is to control communication of first information processor 1, and controls communication of local side (first information processor 1 side) and global side (communication network 5 side), by using the so-called NAT. Types of NAT include F NAT, R NAT, PR NAT, Sa NAT, AS NAT, Sc NAT, Sd NAT, Se NAT, and PS NAT.

Second communication control unit 4 is to control communication of second information processor 2, by using the NAT, same as first communication control unit 3. In the communication system of the preferred embodiment, as described below, in all combinations of NATs used in first communication control unit 3 and second communication control unit 4, communication between first information processor 1 and second information processor 2 can be established. In first communication control unit 3 and second communication control unit 4, ports are assigned so that the port numbers may increase or decrease in every specified port number differential. In the following explanation, the ports are assigned so that the port numbers may increase.

FIG. 4 is a block diagram of configuration of server 6. In FIG. 4, server 6 comprises communication unit 61, reference port detector 62, reference port transmitter 63, port number differential detector 64, bubble packet transmitting port detector 65, re-send instruction transmitter 66, bubble packet transmitting port transmitter 67, and port number differential transmitter 68.

Communication unit 61 communicates between reference port detector 62 and other parts of server 6, and first information processor 1 and second information processor 2.

Reference port detector 62 receives a reference port detection packet, and detects the position of reference port on the basis of the reference port detection packet. The reference port detection packet is received, for example, by reception of communication. The reference port detection packet is sent from second information processor 2 by way of second communication control unit 4.

Reference port transmitter 63 transmits reference port information to first information processor 1. The reference port information shows the position of reference port by, for example, port number of reference port.

Port number differential detector 64 detects the port number differential in first communication control unit 3. This is detected by receiving the port number differential detection packet sent from first information processor 1. Port number differential detector 64 also detects the port number differential in second communication control unit 4. This is detected by receiving the port number differential detection packet sent from second information processor 2. Of course, a first port detector for detecting the port number differential in first communication control unit 3, and a second port detector for detecting the port number differential in second communication control unit 4 may be provided. They are realized by one only, that is, port number differential detector 64. That is, of port number differential detector 64, the portion for detecting the port number differential in first communication control unit 3 is the first port detector and the portion for detecting the port number differential in second communication control unit 4 is the second port detector.

Bubble packet transmitting port detector 65 detects the position of bubble packet transmitting port in first communication control unit 3. This is detected by receiving the port detection packet sent from first information processor 1 by way of first communication control unit 3. The port detection packet is received, for example, by reception of communication. More specifically, bubble packet transmitting port detector 65 receives port detection packets transmitted before and after transmission of bubble packet. It is judged if two ports in first communication control unit 3 used in transmission of port detection packets, and the bubble packet transmitting port are consecutive or not. As a result of judging, if these ports are consecutive, the position of the ports enclosed by two ports in first communication control unit 3 used in transmission of port detection packets is detected as the position of the bubble packet transmitting port. Being consecutive refers to a state of arrangement of these ports and bubble packet transmitting port at an interval of port number differential of first communication control unit 3. Meanwhile, it may be judged to be consecutive when the interval of two ports of first communication control unit 3 used in transmission of port detection packets is 2 times of port number differential of first communication control unit 3 detected by port number differential detector 64. On the other hand, if two ports in first communication control unit 3 used in transmission of port detection packets and the bubble packet transmitting port are not consecutive, the bubble packet transmitting port cannot be detected.

Re-send instruction transmitter 66 transmits a re-send instruction to first information processor 1 if the position of bubble packet transmitting port cannot be detected by bubble packet transmitting port detector 65. The re-send instruction is an instruction for transmitting bubble packet and port detection packet again. That is, bubble packet transmitting port detector 65 detects the position of bubble packet transmitting port by using the port detection packet sent again by transmission of re-send instruction. The re-send instruction is transmitted repeated until the position of bubble packet transmitting port is detected by bubble packet transmitting port detector 65, or by a specified limit (for example, 10 times), or for a specified duration (for example, 30 seconds).

Bubble packet transmitting port transmitter 67 sends bubble packet transmitting port information to second information processor 2. The position of bubble packet transmitting port indicated by bubble packet transmitting port information is the position detected by bubble packet transmitting port detector 65.

Port number differential transmitter 68 sends port differential information to first information processor 1. The port differential information is the information showing the port number differential in second communication control unit 4 detected by port differential number detector 64.

The operation of communication system of the preferred embodiment is explained. Referring now to the flowchart in FIG. 5, the communication method until start of communication between first information processor 1 and second information processor 2 is explained.

(Step S101) Reference port detection packet is sent from second information processor 2 to server 6, and the position of reference port is detected on the basis of the reference port detection packet. Reference port information showing the position of reference port is sent to first information processor 1 from server 6. Detail of step S101 is explained below.

(Step S102) First information processor 1 sends bubble packet to second communication control unit 4 on the basis of reference port information. Port detection packet used in detection of bubble packet transmitting port is sent to server 6. Detail of step S102 is explained below.

(Step S103) Bubble packet transmitting port detector 65 of server 6 judges if the position of bubble packet transmitting port can be detected or not on the basis of the port detection packet received at step S102. If detected, the process goes to step S104, and if not detected, re-send instruction transmitter 66 transmits a re-send instruction to first information processor 1, and the process returns to step S102. The re-send instruction is received in re-send instruction receiver 16 of first information processor 1.

(Step S104) Server 6 detects the position of bubble packet transmitting port, and sends the bubble packet transmitting port information showing its position to second information processor 2. Second information processor 2 transmits sends a reply packet to first communication control unit 3 on the basis of the bubble packet transmitting port information. Detail of step S104 is explained below.

(Step S105) Reply packet receiver 17 of first information processor 1 judges if reply packet is received or not. When reply packet is received, the process goes to step S106, or if not received, the process returns to step S101, and the process from step S101 is repeated.

(Step S106) Re-reply packet transmitter 18 of first information processor 1 sends re-reply packet to second communication control unit 4.

(Step S107) Re-reply packet receiver 25 of second information processor 2 judges if re-reply packet is received or not. When re-reply packet is received, by sending the packet to either port of first communication control unit 3 used in transmission of re-reply packet, communication is established between first information processor 1 and second information processor 2 without resort to server 6, and the process of establishment of communication is terminated. On the other hand, if re-reply packet is not received, communication is not established, the process returns to step S101, and the process from step S101 is repeated.

Figure 5:
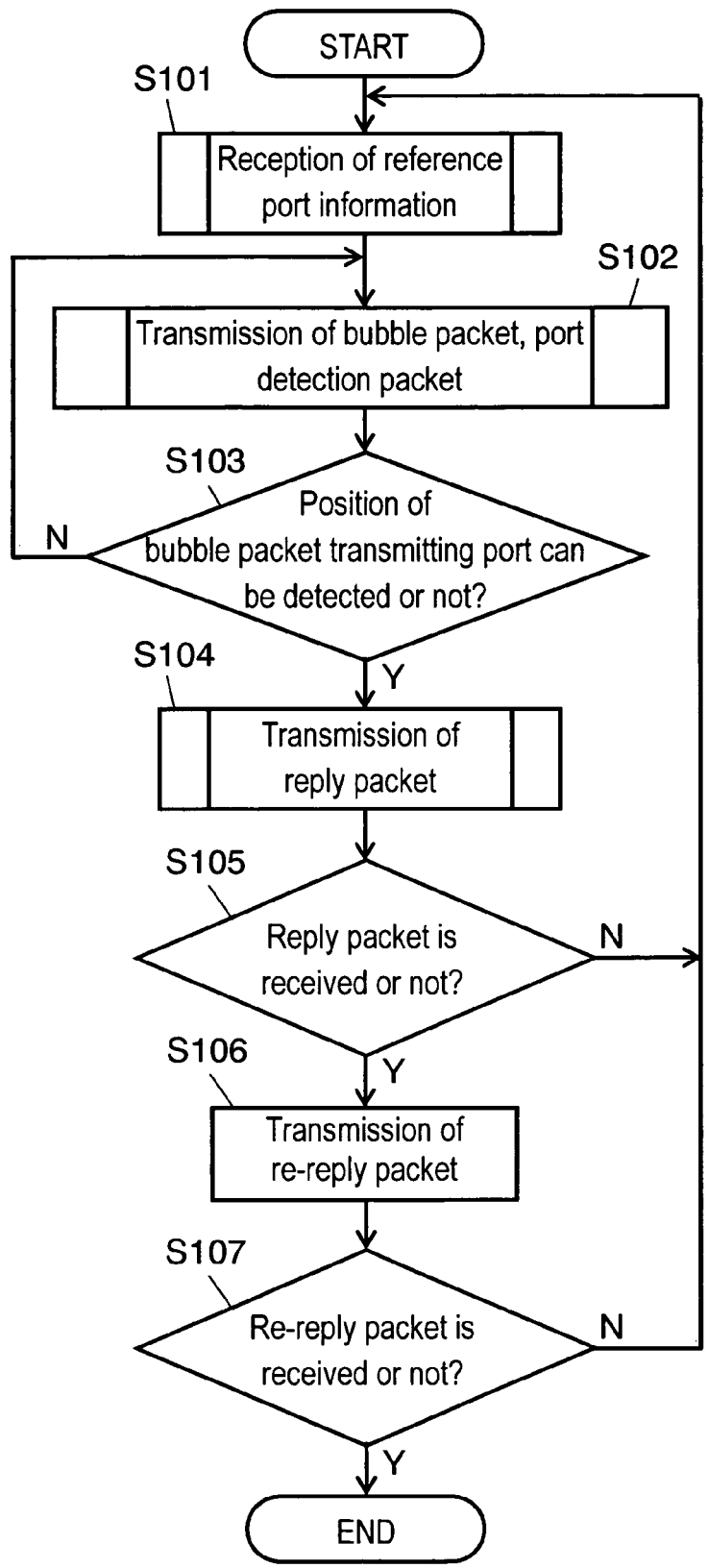
FIG. 5 is a flowchart of operation of communication system in the preferred embodiment.
Figure 6:
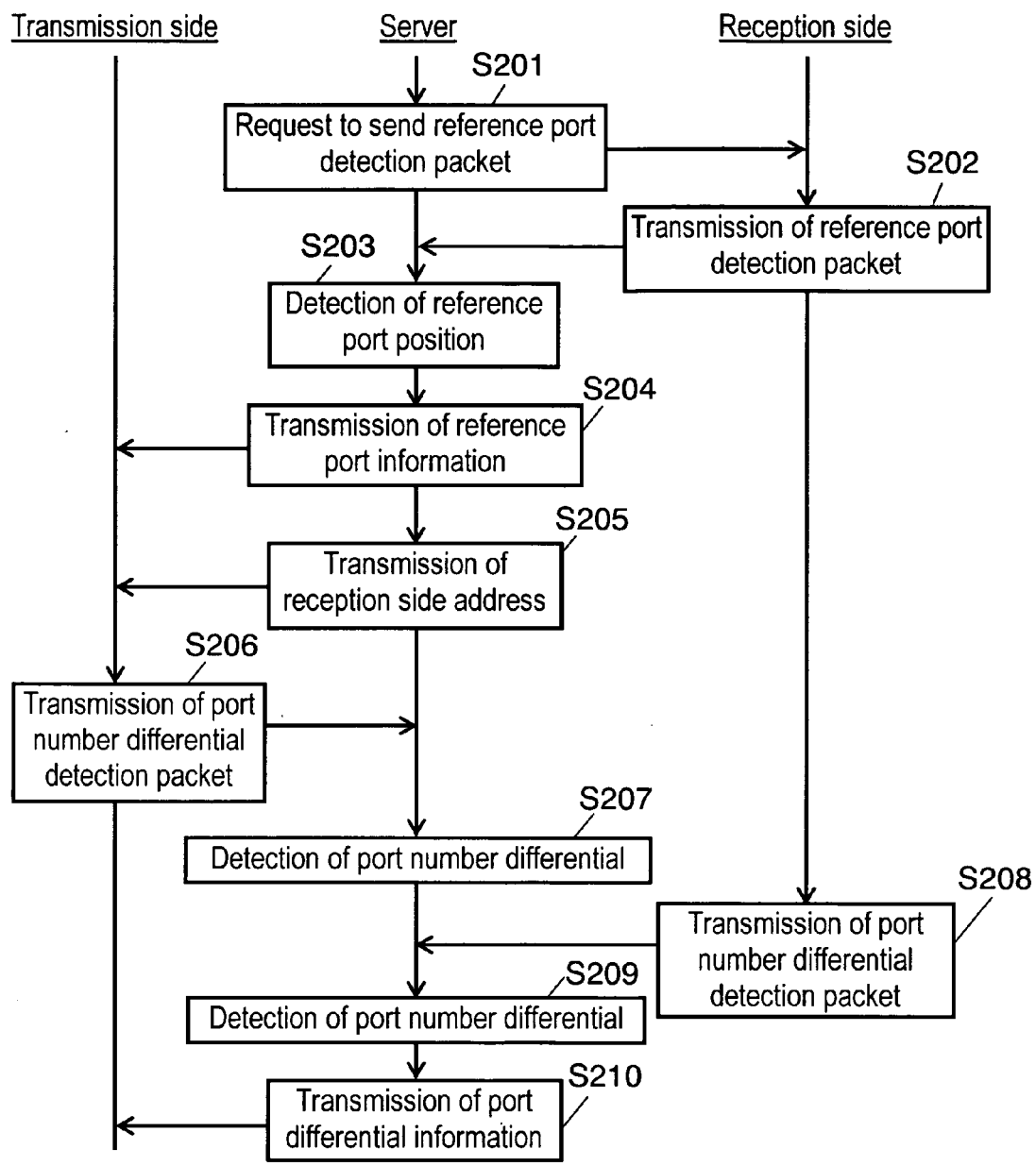
FIG. 6 is an explanatory diagram of process of establishment of communication in the preferred embodiment.

The process at step S101 in flowchart in FIG. 5 is explained by referring to FIG. 6. FIG. 6 is an explanatory diagram of process of exchange of information among transmission side, server, and reception side. The transmission side is the concept including first information processor 1 and first communication control unit 3, and the reception side is the concept including second information processor 2 and second communication control unit 4.

(Step S201) Server 6 sends a transmission request of reference port detection packet to second information processor 2.

(Step S202) Reference port detection packet transmitter 22 of second information processor 2 receives transmission request of reference port detection packet sent from server 6, and transmits reference port detection packet to server 6. Reference port detection packet transmitter 22 transmits the reference port detection packet by using the latest port assigned in second communication control unit 4. For example, the reference port detection packet is transmitted by using the newest assigned port in second information processor 2.

(Step S203) Reference port detector 62 of server 6 receives the reference port detection packet sent from second information processor 2. Reference port detector 62 detects the position of reference port by referring to the port number of reference port contained in the header of reference port detection packet.

(Step S204) Reference port transmitter 63 transmits the reference port information as the information showing the position of reference port detected in reference port detector 62, to first information processor 1. The reference port information is received in reference port receiver 12 in first information processor 1.

(Step S205) Server 6 sends the address information showing the IP address of second communication control unit 4 to first information processor 1. The address information is received in communication unit 11, and is transferred to bubble packet transmitter 13.

Figure 7:
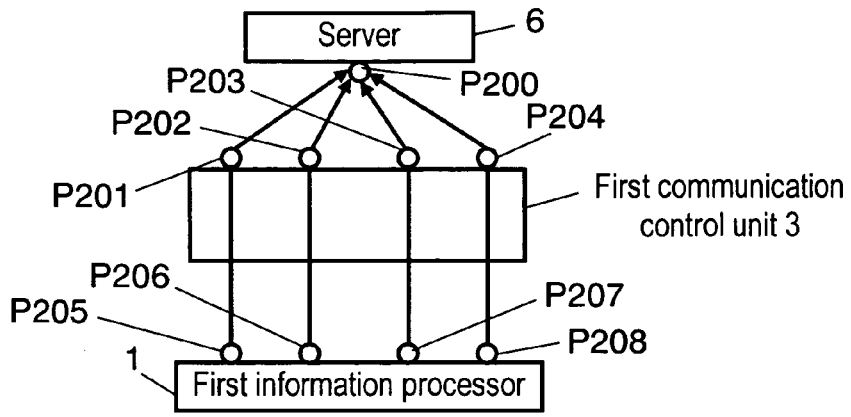
FIG. 7 is an explanatory diagram of detection of port number differential in the preferred embodiment.

(Step S206) Port number differential detection packet transmitter 15 of first information processor 1 sends a port number differential detection packet to server 6. In this transmission, it is arranged so that plural port number differential detection packets may pass through different ports in first communication control unit 3. The port number differential detection packet is transmitted, for example, from plural ports of different port numbers in first information processor 1. FIG. 7 is an explanatory diagram of transmission of port number differential detection packet. Port number differential detection packet transmitter 15 transmits port number differential detection packets to port P200 of server 6, sequentially from different ports P205 to P208. In first communication control unit 3, these packets pass through different ports P201 to P204, individually. In FIG. 7, it is supposed that packets are transmitted in the sequence of ports P205 to P208. It is also supposed that first information processor 1 has not used ports P205 to P208 in communication with server 6 before transmission of port number differential detection packet.

(Step S207) Port number differential detector 64 of server 6 receives the port number differential detection packet sent from first information processor 1, and detects the port number differential on the basis of this port number differential detection packet. Detection method of port number differential is explained. Port number differential detector 64 receives port number differential detection packet, and detects ports P201 to P204 of first communication control unit 3 used in transmission of each port number differential detection packet. For example, if the port interval of port P202 and port P201 is 12, the port interval of port P203 and port P202 is 6, and the port interval of port P204 and port P203 is 18, the smallest port interval of 6 is detected as port number differential. Or the greatest common measure of port intervals may be detected as port number differential. For example, in the case the port interval of port P202 and port P201 is 12, the port interval of port P203 and port P202 is 6, and the port interval of port P204 and port P203 is 9, the greatest common measure of 3 may be detected as port number differential. Detecting method of port number differential is not limited to these examples, but the port number differential may be detected by any other method. The number of port number differential detection packets used in transmission of detection of port number differential is not limited to 4, but may be freely changed within a range of detecting the port number differential.

(Step S208) Port number differential detection packet transmitter 26 of second information processor 2 sends a port number differential detection packet to server 6. Herein, the port number differential detection packet is transmitted same as at step S206.

(Step S209) Port number differential detector 64 of server 6 receives the port number differential detection packet sent from second information processor 2, and detects the port number differential in second communication control unit 4 on the basis of the port number differential detection packet. Detecting method of port number differential is same as at step S207, and its explanation is omitted. In detection process of port number differential at this step S209, as compared with detection of port number differential at step S207, high strictness is not demanded. That is, a multiple of actual port number differential in second communication control unit 4 may be detected as port number differential. The port number differential detected at this step S209 is used for determining the port remote from the reference port by the port interval equivalent to a multiple of port number differential detected at this step S209 (in the port number increasing direction if the port numbers are assigned in the ascending direction) as the target port for transmitting bubble packet. As a result, if the port number differential detected at this step is a multiple of actual port number differential, the target port number of transmitting bubble packet determined in this manner is the port assigned after the ports are assigned certain times from the reference port, and hence this port can be used as the target port number of transmitting bubble packet. Therefore, in detection of port number differential at step S208 or S209, the port number differential may be detected by transmission of a small number of port number differential detection packets.

(Step S210) Port number differential transmitter 68 of server 6 sends the port differential information showing the port number differential detected at step S209 to first information processor 1.

In FIG. 6, the reception side address may be transmitted (step S205) anytime, for example, before transmission of reference port information (step S204) or transmission request of reference port detection packet (step S201). The process from transmission of port number differential detection packet (step S208) to transmission of port number differential information (step S210) may be also conducted before the process of transmission of port number differential detection packet (step S206). Thus, there is a certain freedom in the sequence of process in FIG. 6.

Figure 8:
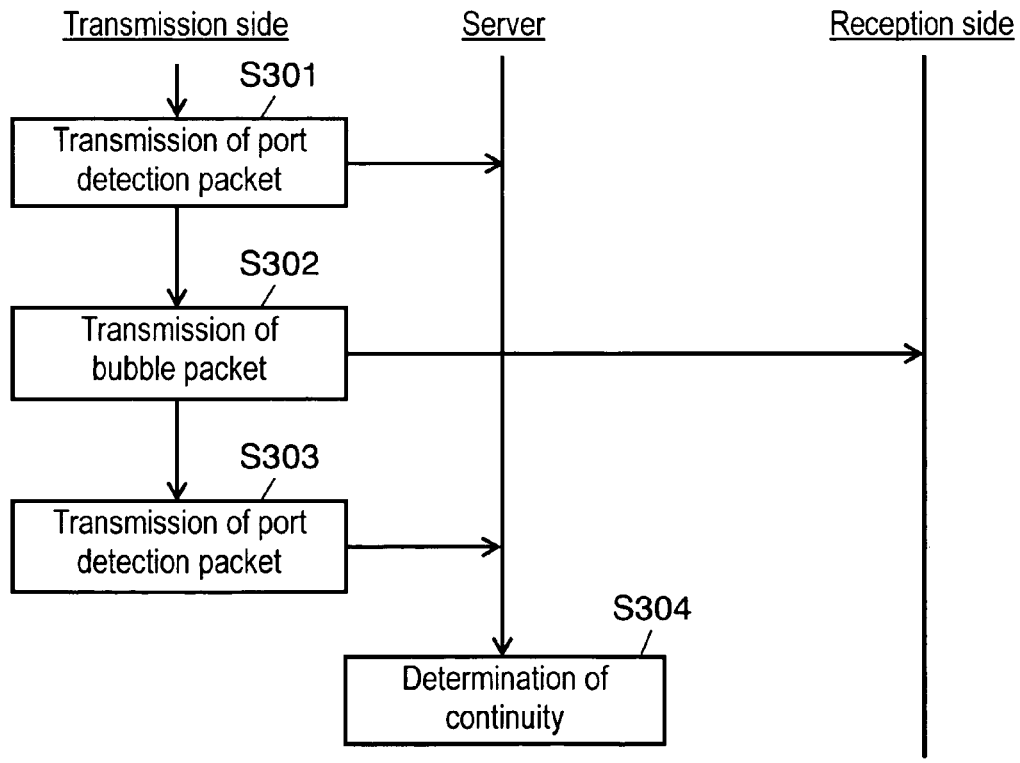
FIG. 8 is an explanatory diagram of process of establishment of communication in the preferred embodiment.

The process at step S102 in flowchart in FIG. 5 is explained by referring to FIG. 8. FIG. 8 is an explanatory diagram of process of exchange of information among transmission side, server, and reception side.

(Step S301) Detection packet transmitter 14 of first information processor 1 sends the port detection packet to server 6 by way of first communication control unit 3. In this transmission, the packet is transmitted so that the port detection packet may pass the latest assigned port in first communication control unit 3. This is intended to detect properly the position of the bubble packet transmitting port. For example, detection packet transmitter 14 sends the port detection packet by using a port of first information processor 1 not used so far in communication between first information processor 1 and server 6. Thus transmitted port detection packet is received in bubble packet transmitting port detector 65 in server 6. This bubble packet transmitting detector 65 refers to the header of port detection packet, and detects the position of the port of first communication control unit 3 used in transmission of port detection packet.

(Step S302) Bubble packet transmitter 13 of first information processor 1 sends the bubble packet to second communication control unit 4. This bubble packet is transmitted from the reference port to the port assigned after port assignment of specified times (a) in second communication control unit 4.

(Step S303) Detection packet transmitter 14 of first information processor 1 sends the port detection packet to server 6 by way of first communication control unit 3. In this transmission, the packet is transmitted so that the port detection packet may pass the latest assigned port in first communication control unit 3. For example, detection packet transmitter 14 sends the port detection packet by using a port of first information processor 1 not used so far in communication between first information processor 1 and server 6, transmission of port detection packet at step S301, or transmission of bubble packet. Thus transmitted port detection packet is received in bubble packet transmitting port detector 65 in server 6. This bubble packet transmitting detector 65 refers to the header of port detection packet, and detects the position of the port of first communication control unit 3 used in transmission of port detection packet.

(Step S304) Bubble packet transmitting port detector 65 in server 6 judges the continuity of the port position of first communication control unit 3 used in transmission of two port detection packets and bubble packet transmitting port at steps S301, S303.

Figure 9:
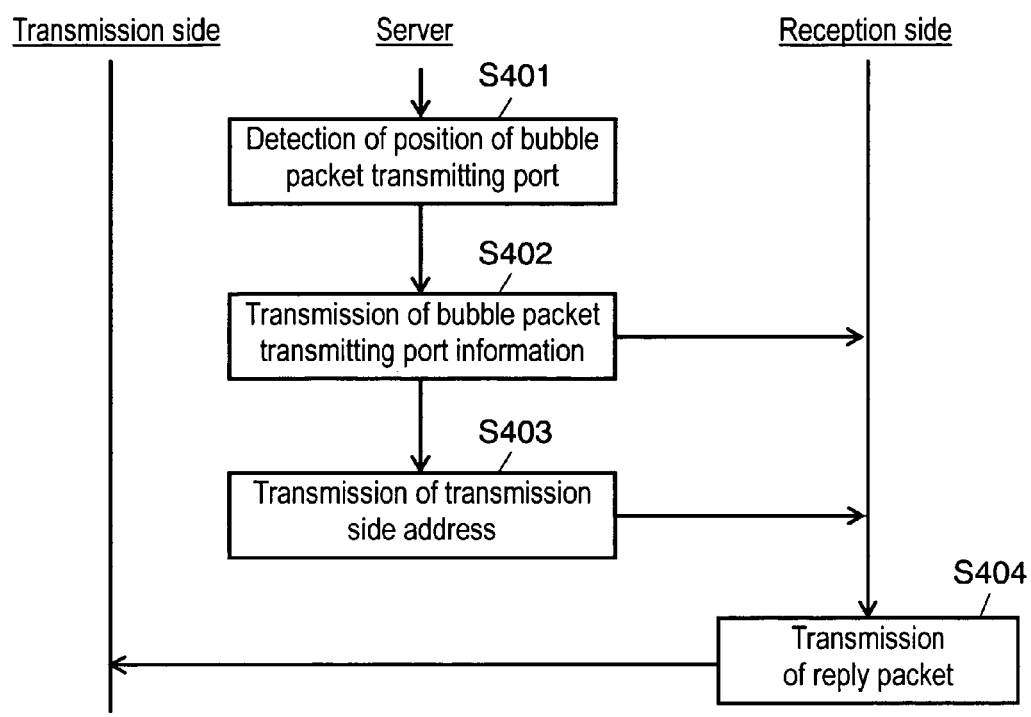
FIG. 9 is an explanatory diagram of process of establishment of communication in the preferred embodiment.

The process at step S104 in flowchart in FIG. 5 is explained by referring to FIG. 9. FIG. 9 is an explanatory diagram of process of exchange of information among transmission side, server, and reception side.

(Step S401) Bubble packet transmitting port detector 65 of server 6 detects the position of bubble packet transmitting port.

(Step S402) Bubble packet transmitting port transmitter 67 of server 6 sends bubble packet transmitting port information to second information processor 2. The bubble packet transmitting port information is received in bubble packet transmitting port receiver 23 of second information processor 2.

(Step S403) Server 6 sends the address information showing the IP address of first communication control unit 3 to second information processor 2. This address information is received in communication unit 21, and is transferred to reply packet transmitter 24.

(Step S404) Reply packet transmitter 24 of second information processor 2 sends a reply packet to first communication control unit 3 specified by the address information received at step S403. This reply packet is sent to the bubble packet transmitting port indicated by the bubble packet transmitting port information received in bubble packet transmitting port receiver 23.

In FIG. 9, the sequence of transmission of bubble packet transmitting port information (step S402) and transmission of transmission side address (step S403) is not specified.

Operation of communication system of the preferred embodiment is explained by referring to specific examples. In the specific examples, IP addresses of first communication unit 3, second communication unit 4, and server 6 (as for first and second communication control units 3 and 4, communication network 5 side addresses) are as follows.

First communication control unit 3: 202.132.10.6
Second communication control unit 4: 131.206.10.240
Server 6: 155.32.10.10

It is supposed in the specific examples as follows: that is, in example 1, PS NAT is used in first communication control unit 3 and second communication control unit 4. In example 2, Sd NAT is used in first communication control unit 3, and PS NAT in second communication control unit 4. In example 3, Sd NAT is used in first communication control unit 3, and AS NAT in second communication control unit 4.

Example 1

Figure 10:
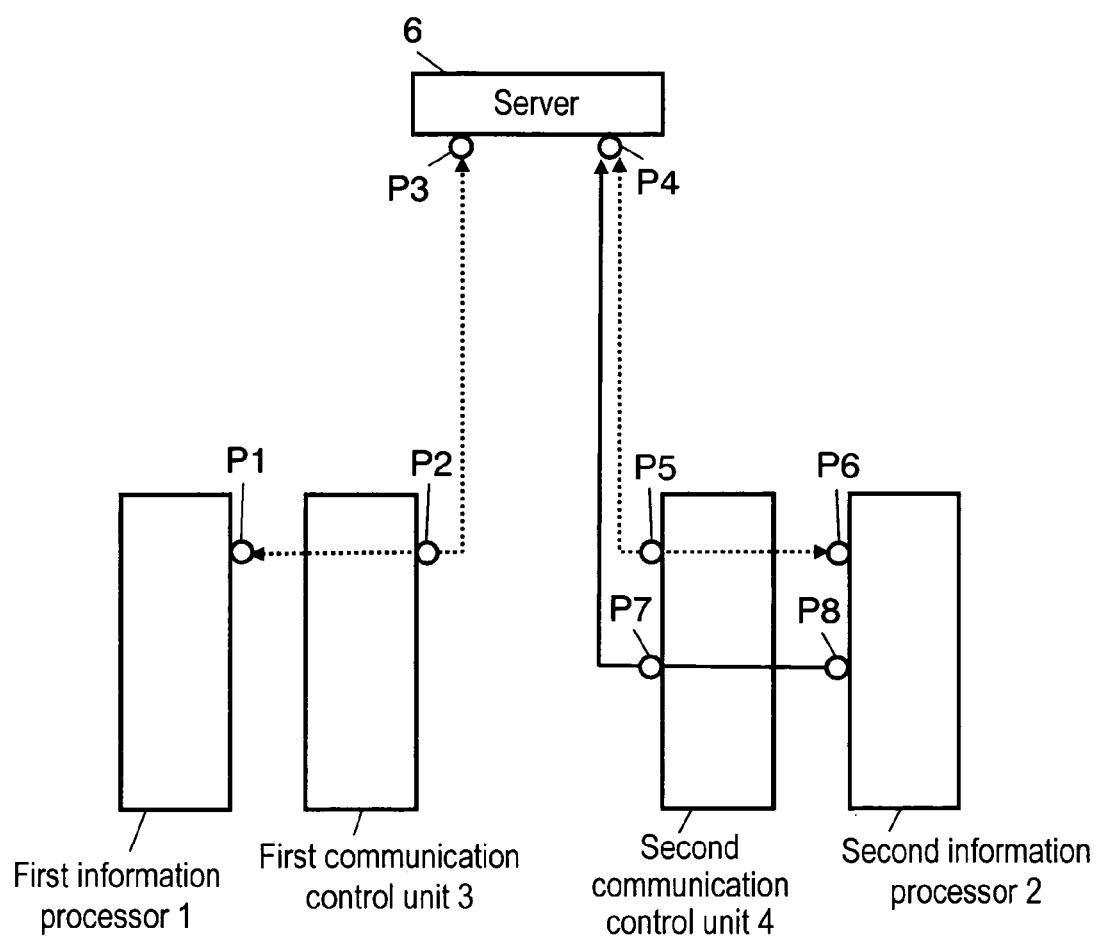
FIG. 10 is an explanatory diagram of specific example in the preferred embodiment.
Figure 13:
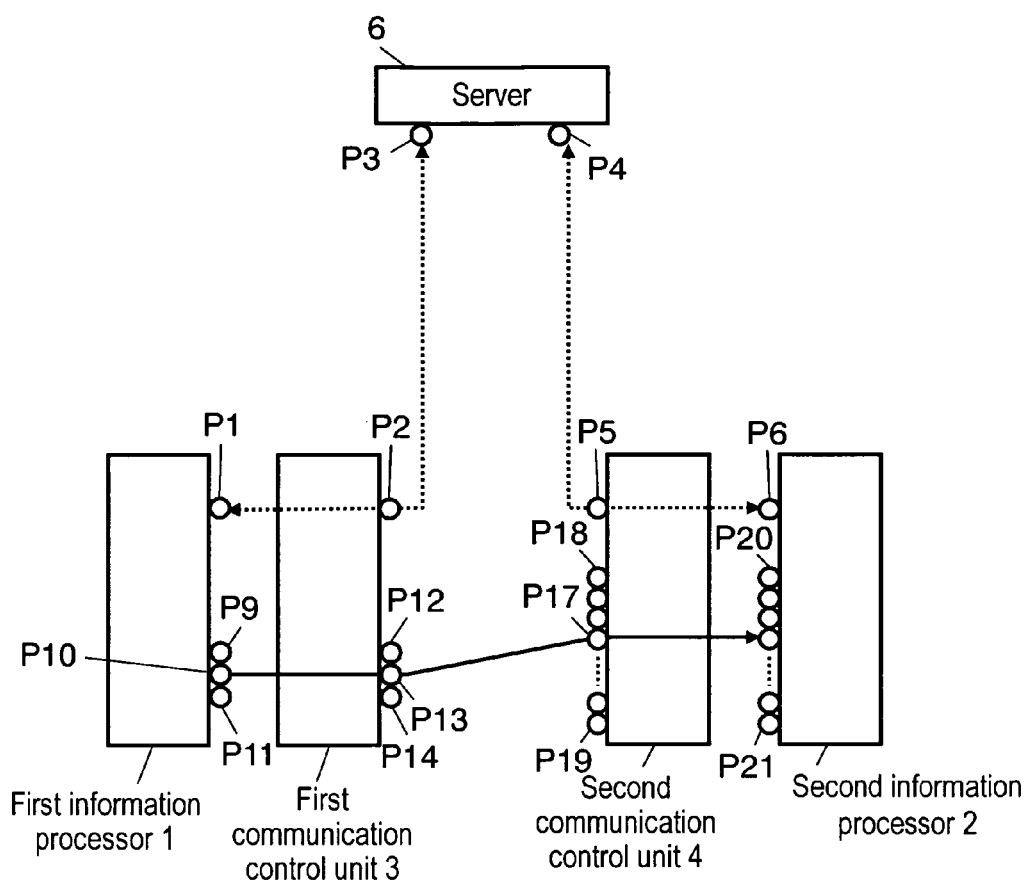
FIG. 13 is an explanatory diagram of specific example in the preferred embodiment.

FIG. 10 and FIG. 13 show example 1. First, in example 1, connection is requested from first information processor 1. In FIG. 10, first information processor 1 has prior knowledge about IP address of server 6 (155.32.10.10), and sends device ID of first information processor 1 (1234567890123456) to server 6. This device ID is, for example, MAC address, EU164 base address, or other GUID (global unique ID). The device ID is transmitted to port P3 of server 6 by way of port P2 assigned in first communication control unit 3 from port P1 of first information processor 1. By this transmission, server 6 acquires knowledge of the device ID of first information processor 1, IP address of first communication control unit 3 (202.132.10.6) and port number (10034) of port P2 in first communication control unit 3. These items of information are held in server 6.

Next, first information processor 1 sends the device ID (9876543210123456) of second information processor 2 for requesting connection to server 6, and requests connection to second information processor 2. As a result, server 6 receives this connection request, and judges if second information processor 2 has already accessed server 6 or not. Access by second information processor 2 is also achieved by sending device ID of second information processor 2 same as in the case of first information processor 1. Therefore, if second information processor 2 has already accessed server 6, server 6 has already known and held the device ID (9876543210123456) of second information processor 2, IP address (131.206.10.240) of second communication control unit 4, and port number (23495) of port P5 of second communication control unit 4 used in transmission and reception of information between second information processor 2 and server 6. If second information processor 2 has already accessed server 6, process of reception reference port information (step S101) is started. On the other hand, if second information processor 2 has not accessed server 6, connection request from first information processor 1 is an error, and communication between first information processor 1 and second information processor 2 is not established.

In the process about reception of reference port information, server 6 requests transmission of reference port detection packet to second information processor 2, by way of port P5 of second communication control unit 4 (step S201). In consequence, the transmission request is received in reference port detection packet transmitter 22 of second information processor 2. Reference port detection packet transmitter 22 sends a reference port detection packet by way of second communication control unit 4 from port P8 newly assigned, different from port P6 used so far in communication with server 6, in second information processor 2 (step S202). In this transmission of reference port detection packet, in second communication control unit 4, port P7 (port number 23500) is newly assigned. This reference port detection packet is received in reference port detector 62 of server 6. As the position of reference port P7, port number 23500 is detected (step S203).

Reference port transmitter 63 receives port number 23500 from reference port detector 62, and composes reference port information including port number 23500 of reference port P7, and transmits the reference port information to first information processor 1 (step S204). This is transmitted by way of port P2 of first communication control unit 3. Reference port receiver 12 of first information processor 1 receives the reference port information by way of communication unit 11, and transfers port number 23500 of reference port P7 included in the reference port information to bubble packet transmitter 13.

Server 6 transmits address information showing IP address (131.206.10.240) of second communication control unit 4 to first information processor 1 (step S205). This address information is received in communication unit 11, and is transferred to bubble packet transmitter 13. Thus, bubble packet transmitter 13 has knowledge of IP address (131.206.10.240) of second communication control unit 4.

Port number differential detection packet transmitter 15, when communication unit 11 detects reception of IP address, transmits plural port number differential detection packets as shown in FIG. 7 (step S206). In FIG. 10, transmission of port number differential detection packet is not shown. Port number differential detection packets are received in port number differential detector 64 in server 6, and the port number differential is detected. In this case, it is supposed that port number differential of 1 is detected (step S207). The detected port number differential is transferred to bubble packet transmitting port detector 65.

Port number differential detection packet transmitter 26, by instruction from port number differential detector 64 in server 6, transmits plural port number differential detection packets (step S208). In FIG. 10, transmission of port number differential detection packet is not shown. Port number differential detection packets are received in port number differential detector 64 in server 6, and the port number differential is detected. In this case, it is supposed that port number differential of 1 is detected (step S209). Port number differential transmitter 68 transmits the detected port number differential of 1 to first information processor 1 (step S210). The port number differential of 1 is received in port number differential receiver 19, and is transferred to bubble packet transmitter 13.

Bubble packet transmitter 13, before sending bubble packet, transfers an instruction of transmission of port detection packet to detection packet transmitter 14. As a result, detection packet transmitter 14 transmits a port detection packet to port P15 of server 6, by using port P9 not used so far in communication with server 6 and newly assigned (a port newly assigned in first information processor 1) (step S301). Port P15 is supposed to be instructed from server 6. This port detection packet is transmitted by using newly assigned port P12 (port number 10040) in first communication control unit 3. Bubble packet transmitting port detector 65 of server 6 receives this port detection packet, and detects port number 10040 of port P12 of first communication control unit 3. Bubble packet transmitting port detector 65 holds port number 10040 of port P12.

Detection packet transmitter 14, after transmission of port detection packet, informs bubble packet transmitter 13 of notice of transmission of port detection packet. Bubble packet transmitter 13, in consequence, transmits bubble packet to second information control unit 4 of IP address 131.206.10.240 by using port P10, a newly assigned port not used so far in communication with server 6 (step S302). In this transmission of bubble packet, it is supposed that bubble packets are transmitted from port number 23500 of reference port P7 received from reference port receiver 12 to port P17 of port number 23550 apart by a specified multiple of port number differential of 1 received in port number differential receiver 19, that is, 50 times (or α=50). Bubble packets are supposed to be transmitted by using port P13 (port number 10041) of first communication control unit 3. Bubble packet transmitter 13, after transmission of bubble packets, sends the notice of α=50 to server 6. In response, server 6 sends the same notice to second information processor 2. The notice of α=50 is received in reply packet transmitter 24.

Bubble packet transmitter 13, after transmission of bubble packet, transfers an instruction of notice of transmission of port detection packet to detection packet transmitter 14. Detection packet transmitter 14 transmits the port detection packet to port 16 of server 6, by using newly assigned port P11 not used so far in communication with server 6 (step S303). This port detection packet is transmitted by using port P14 (port number 10042) newly assigned in first communication control unit 3. Thus, the bubble packet and port detection packet are transmitted by using different ports in first communication control unit 3.

Bubble packet transmitting port detector 65 of server 6 receives this port detection packet, and detects port number 10042 of port P14 of first communication unit 3. Bubble packet transmitting port detector 65 compares port number 10040 of held port P12 and port number 10042 of detected port P14, and the difference is 2, which is 2 times of the port number differential of 1 detected at step S207, and it is judged that port P12, P14 in first communication control unit 3 used in transmission of two port detection packets and bubble packet transmitting port P13 are consecutive (step S304). As a result, it is judged that the position of the bubble packet transmitting port can be detected (step S103), and bubble packet transmitting port detector 65 detects the middle port number 10041 of port P12 and port P14 as the position of bubble packet transmitting port (step S401).

Bubble packet transmitting port transmitter 67 composes bubble packet transmitting port information including port number 10041 of bubble packet transmitting port number P13 detected by bubble packet transmitting port detector 65, and transmits this bubble packet transmitting port information to second information processor 2 by way of port P5 of second communication control unit 4 (step S402). The bubble packet transmitting port information is received in bubble packet transmitting port receiver 23 of second information processor 2. Port number 10041 of bubble packet transmitting port P13 included in the bubble packet transmitting port information is transferred to reply packet transmitter 24.

Server 6 transmits address information showing IP address (202.132.10.6) of first communication control unit 3 to second information processor 2 (step S403). This address information is received in communication unit 21, and is transferred to reply packet transmitter 24. Thus, reply packet transmitter 24 acknowledges IP address 202.132.10.6 of first communication control unit 3.

Figure 12:
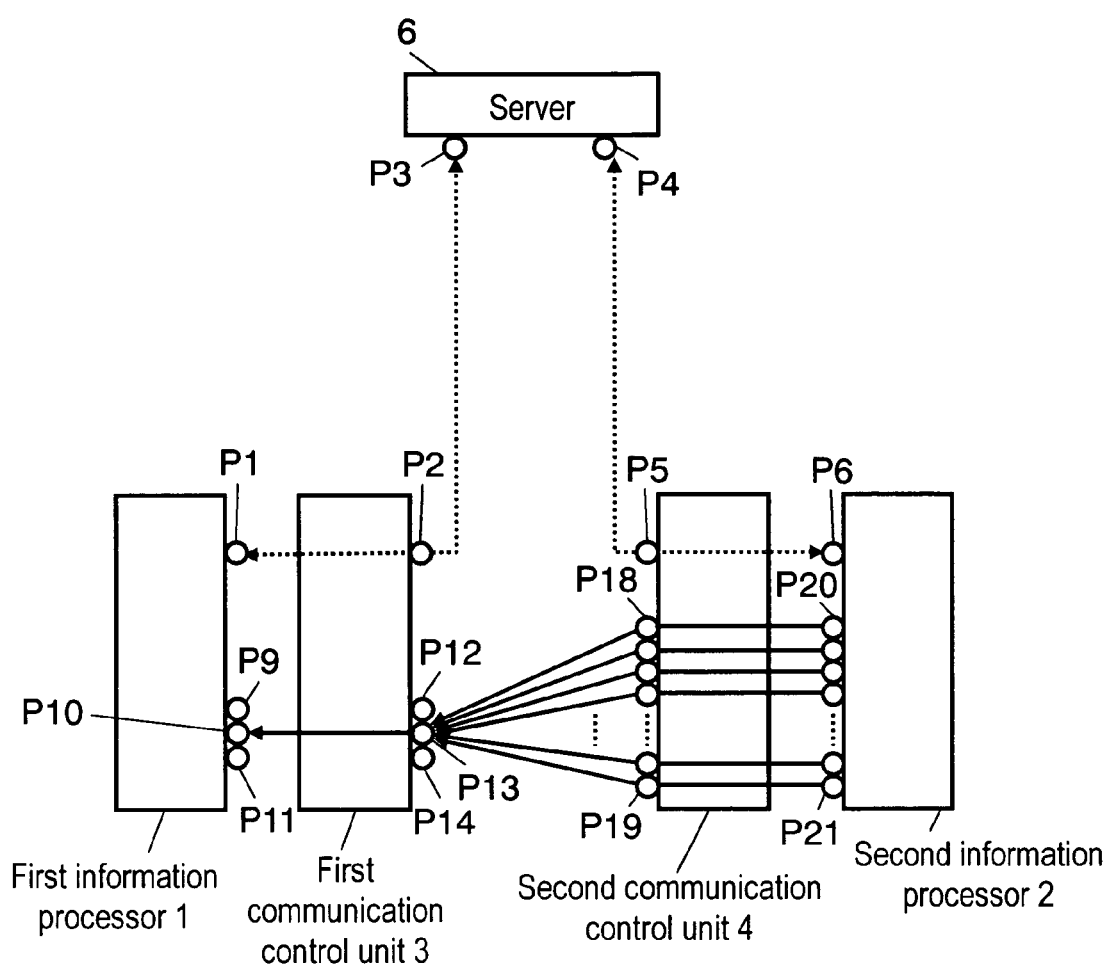
FIG. 12 is an explanatory diagram of specific example in the preferred embodiment.

Reply packet transmitter 24 transmits 50 reply packets to bubble packet transmitting port P13 of port number 10041 in first communication control unit 3 of IP address 202.132.10.6 (step S404). This number 50 corresponds to the value of α received in reply packet transmitter 24 from server 6. Reply packet transmitter 24 transmits 50 reply packets by using 50 ports P20 to P21 newly assigned in second information processor 2 (not used so far in communication with server 6). Therefore, the reply packets are, also in second communication control unit 4, transmitted by newly assigned 50 ports P18 to P19 (see FIG. 12). In second communication control unit 4, the latest port assigned at the moment of transmission of reference port detection packet is port P7, and the bubble packet is transmitted to port P17 which is 50 port numbers away from this port P7, therefore unless port P17 has been already used in other device than second information processor 2 at the time of transmission of reply packet, any one of 50 reply packets is transmitted to first communication control unit 3 by using bubble packet transmitting target port P17. In first communication control unit 3, PS NAT is used, and transmission record of transmission of bubble packets to bubble packet transmitting target port 17 is left in first communication control unit 3, only the reply packet transmitted by using bubble packet transmitting target port 17 can be received. The reply packet is received in replay packet receiver 17 by way of port P10 of first information processor 1.

In this specific example 1, by receiving this reply packet, communication between first information processor 1 and second information processor 2 is established, but herein, successively, transmission of re-reply packet is explained.

Reply packet transmitter 24 of second information processor 2, after transmission of 50 reply packets, sends the notice of completion of transmission of reply packets to server 6 by way of port P5 of second communication control unit 4. Server 6 receives the notice of completion of transmission of reply packets, and sends this notice to first information processor 1 by way of port P2 of first communication control unit 3. Receiving this notice, reply packet receiver 17 of first information processor 1 acquires port number 23550 of port P17 of second communication control unit 4 receiving the replay packets included in the header of replay packet 17 since the reply packet has been already received, and transfers an instruction of transmission of this port number and re-reply packet to re-reply packet transmitter 18 (step S105). If reply packet receiver 17 has not received reply packet, reply packet receiver 17 sends the notice of reception of no reply packet to server 6. As a result, server 6 sends again a transmission request of reference port detection packet to second information processor 2, and the process for establishing the connection between first information processor 1 and second information processor 2 is repeated (steps S101 to S104).

Re-reply packet transmitter 18 sends a re-reply packet to port P17 of port number 23550 received from reply packet receiver 17 (step S106). This re-reply packet is transmitted to second information processor 2 by using port P13 of first communication control unit 3 and port P17 of second communication control unit 4, and is received in re-reply packet receiver 25 in second information processor 2.

Re-reply packet transmitter 18, after transmission of re-reply packet, sends the notice of completion of transmission of re-reply packet to server 6 by way of port P2 of first communication control unit 3. Server 6 receives the notice of completion of transmission of re-reply packet, sends this notice further to second information processor 2 by way of port P5 of second communication control unit 4. Re-reply packet receiver 25 of second information processor 2 receives this notice. In this case, since the re-reply packet has been already received in re-reply packet receiver 25, the process of establishing communication between first information processor 1 and second information processor 2 is terminated (step S107). If re-reply packet receiver 25 has not received re-reply packet, re-reply packet receiver 25 sends the notice of reception of no re-reply packet to server 6. As a result, server 6 sends again a transmission request of reference port detection packet to second information processor 2, and the process for establishing the connection between first information processor 1 and second information processor 2 is repeated (steps S101 to S106).

Then, between first information processor 1 and second information processor 2, peer-to-peer communication by UDP without resort to server 6 is done by way of port P13 of first communication control unit 3 and port P17 of second communication control unit 4.

In this example 1, the port detection packet and bubble packet are transmitted by using consecutive ports in first communication control unit 3, but in the case of, for example, port number 10040 of port P12 and port number 10043 of port P14, if the port detection packet and bubble packet are not transmitted by using consecutive ports in first communication control unit 3, transmission of bubble packet and port detection packet is repeated until the port of first communication control unit 3 used in transmission of port detection packet and the bubble packet transmitting port are consecutive ports (steps S102, S103). Herein, several reasons may be considered why the port of first communication control unit 3 used in transmission of port detection packet, and the bubble transmitting port are not consecutive ports in first communication control unit 3, for example, other device (not shown) than first information processor 1 is connected to the local side of first communication control unit 3, and the ports of first communication control unit 3 are assigned to this device from transmission of port detection packet to transmission of bubble packet, or from transmission of bubble packet to transmission of port detection packet.

Also in example 1, transmission of device ID from first information processor 1, transmission of device ID from second information processor 2, transmission of address information from server 6, and other transmission and reception of information among devices are supposed to be controlled by a control section not shown in first information processor 1 or the like. This concept is the same in the following examples.

Figure 11:
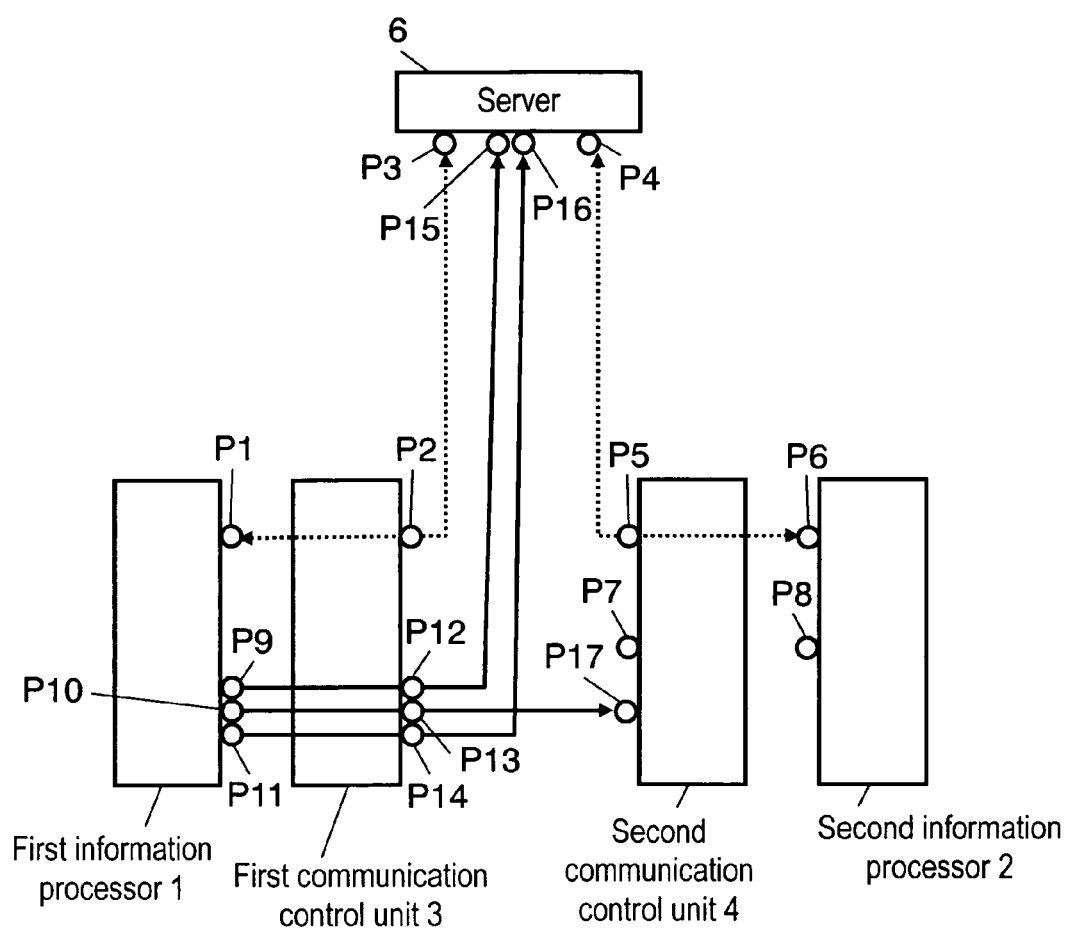
FIG. 11 is an explanatory diagram of specific example in the preferred embodiment.

In FIG. 11, transmission destination ports P15, P16 of port detection packet may be same port, or same as port P3.

In FIG. 11, if PS NAT is used in first communication control unit 3, port P9, port P10, and port P11 may be the same port. In this case, however, port P9 (=port P10, P11) is a port newly assigned at the time of transmission of first port detection packet. Port P15 and port P16 are different.

Example 2

In example 2, Sd NAT is used in first communication control unit 3, and PS NAT is used in second communication control unit 4.

In this case, too, it is same as in example 1 until reply packet is transmitted from second information processor 2 to first communication control unit 3, and its explanation is omitted. In example 2, using same port numbers as in example 1, bubble packets and others are transmitted. In the case of example 2, since Sd NAT is used in first communication control unit 3, that is, the reception filter rule is no filter NAT, all of 50 reply packets sent from second information processor 2 are received in reply packet receiver 17 by way of port P10 of first information processor 1.

Figure 14:
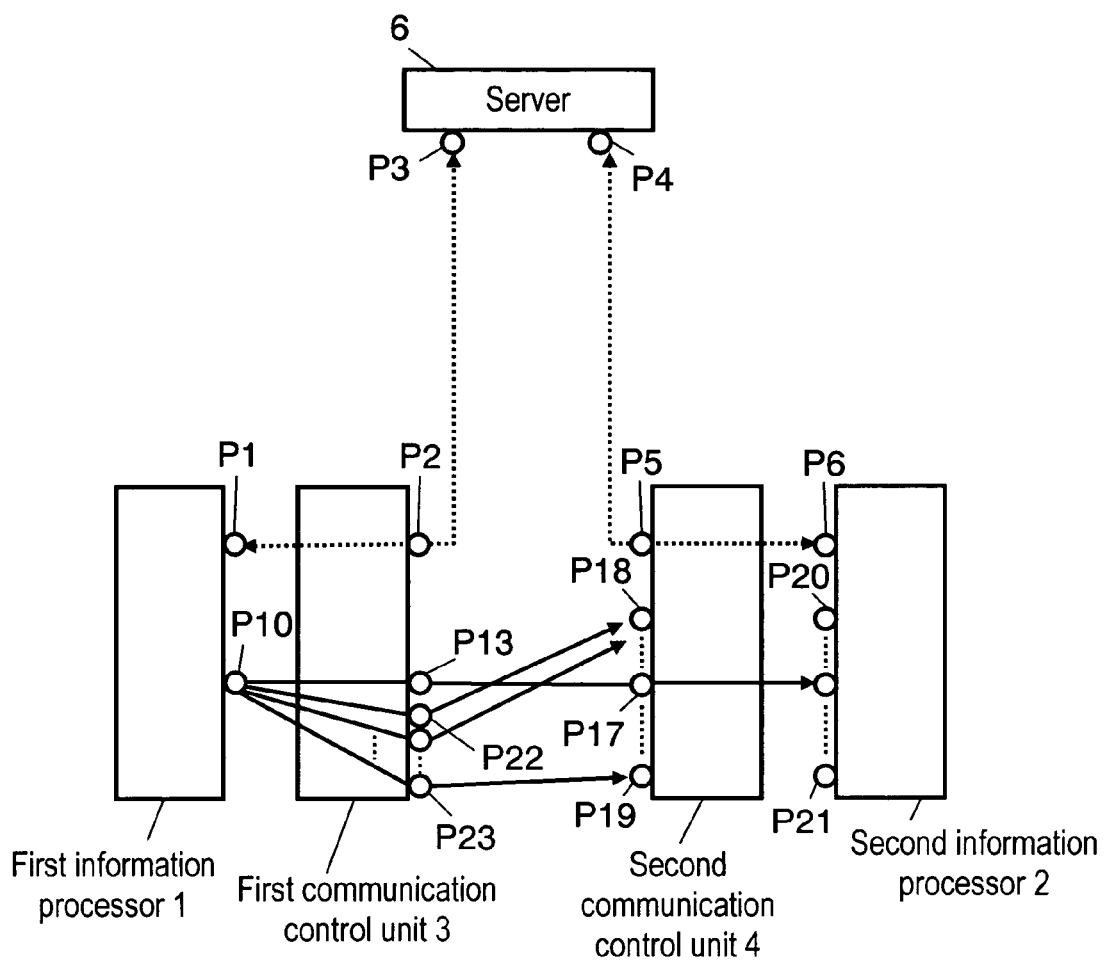
FIG. 14 is an explanatory diagram of specific example in the preferred embodiment.

Reply packet receiver 17 acquires the port number of second communication control unit 4 used in transmission of reply packet from each reply packet, and transfers this port number to re-reply packet transmitter 18. Re-reply packet transmitter 18 receives this port number, and sends a re-reply packet to each port number received in second communication control unit 4 (see FIG. 14). In Sd NAT used in first communication control unit 3, since the transmitting port assigning rule is port sensitive, it is possible to transmit to second communication control unit 4 by using bubble transmitting port P13 in first communication control unit 3 only when the packet is transmitted to bubble packet transmitting target port P17 of second communication control unit 4. Therefore, as shown in FIG. 14, the re-reply packet transmitted to other than bubble packet transmitting target port P17 is transmitted by using ports P22 to P23 newly assigned in first communication control unit 3. Second communication control unit 4, using PS NAT, cannot receive re-reply packet from other than ports of first communication control unit 3 used in transmission of reply packet. Therefore, re-reply packet receiver 25 of second information processor 2 can receive only the re-reply packet transmitted to bubble packet transmitting target port P17. Thus, communication is established between first information processor 1 and second information processor 2.

Significance of sending re-reply packet from first information processor 1 to second communication control unit 4 is explained. If first information processor 1 receives reply packet, communication between first information processor 1 and second information processor 2 may be always established securely through the port allowing to pass this reply packet. That is, as in example 2, communication can be established only in the route of the replay packet sent through bubble packet transmitting target port P17 out of the received reply packets. Or the following situation may be considered. In example 2, even if the reply packet is transmitted without using bubble packet transmitting target port P17 (for example, when bubble packet transmitting target port P17 has been used by other device until transmission of reply packet), first information processor 1 can receive all reply packets. However, if first information processor 1 transmits re-reply packet corresponding to this reply packet, this re-reply packet is not received in second information processor 2, and communication is not established. Thus, by transmission of re-reply packet, it is possible to confirm the position of the port used in peer-to-peer communication capable of establishing communication first information processor 1 and second information processor 2, and it can be confirmed whether communication can be established or not between first information processor 1 and second information processor 2.

Example 3

In example 3, Sd NAT is used in first communication control unit 3, and AS NAT is used in second communication control unit 4. Example 3 refers to a special case of establishing communication between first information processor 1 and second information processor 2 without using bubble packet transmitting target port.

Figure 15:
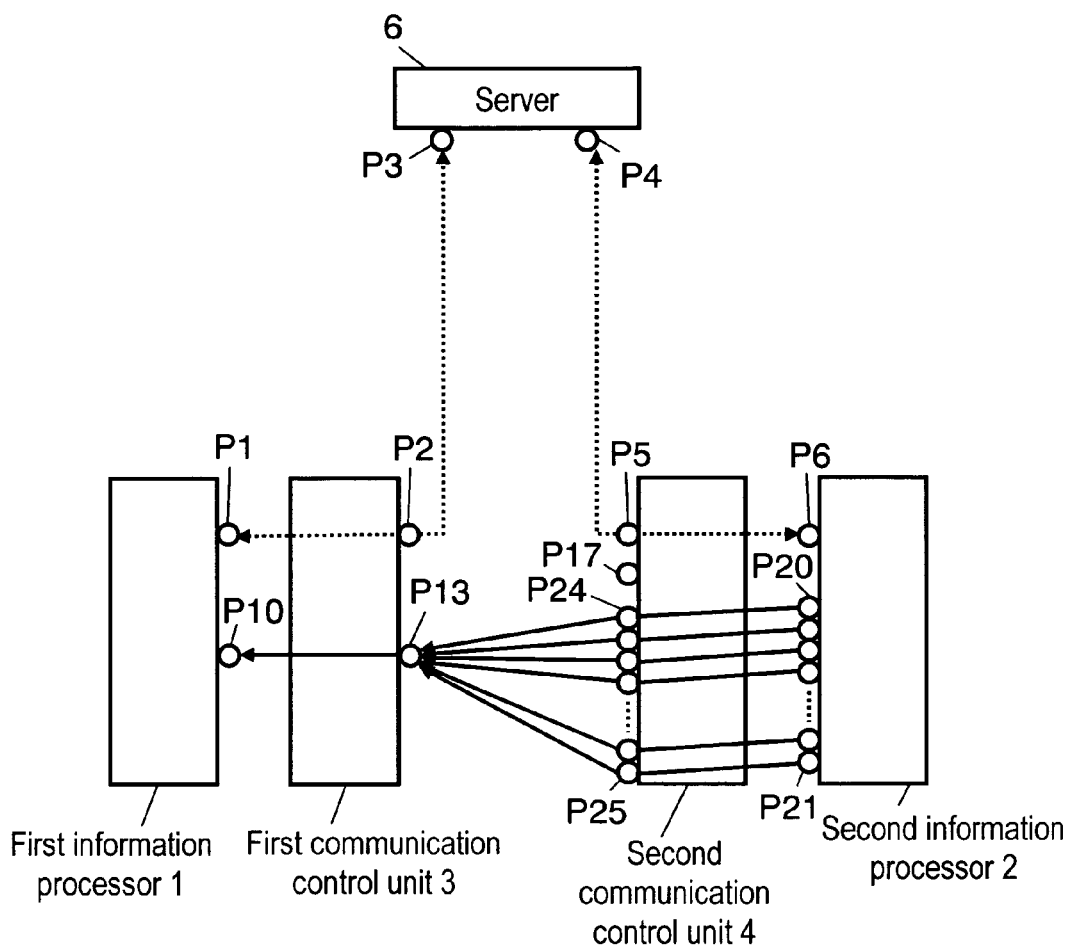
FIG. 15 is an explanatory diagram of specific example in the preferred embodiment.

FIG. 15 is a diagram explaining transmission of reply packet from second information processor 2. In transmission of this reply packet, since bubble packet transmitting target port P17 has been already used by other device, reply packet is supposed to be transmitted by way of ports P24 to P25 in second communication control unit 4 not including bubble packet transmitting target port P17. Since no filter NAT is used in first communication control unit 3, first information processor 1 receives all these reply packets.

Figure 16:
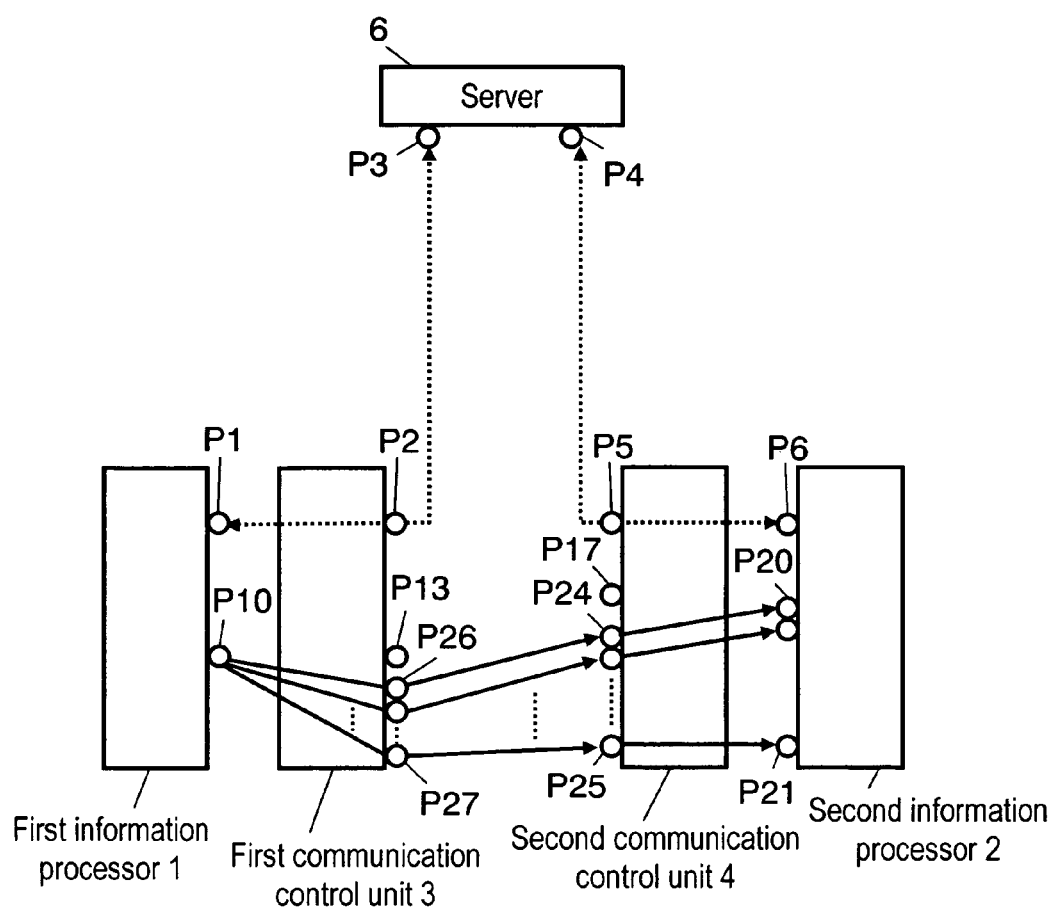
FIG. 16 is an explanatory diagram of specific example in the preferred embodiment.

FIG. 16 is an explanatory diagram of transmission of re-reply packet. As shown in FIG. 16, re-reply packet transmitter 18 is supposed to send re-reply packet to ports P24 to P25 of second communication control unit 4. In this case, since Sd NAT is used in first communication control unit 3, the re-reply packet is sent to ports P24 to P25 of second communication control unit 4 by using newly assigned ports P26 to P27. Since AS NAT, that is, NAT of address sensitive filter is used in second communication control unit 4, these re-reply packets are received in second communication control unit 4, and transferred to ports P20 to P21 of second information processor 2. Later, second information processor 2 selects any one (for example, the first arrival one) out of re-reply packets, and can communicate with first information processor 1 by way of the route of transmission of this re-reply packet (for example, port P26 of first communication control unit 3 and port P24 of second communication control unit 4).

The situation in example 3 corresponds to a case in which no filter or AS filter is used in first communication control unit 3, and no filter or AS filter is used in second communication control unit 4. In this case, therefore, if the position of bubble packet transmitting port P13 can be known accurately, connection of first information processor 1 and second information processor 2 can be realized securely.

When the NAT used in first communication control unit 3 is no filter, all reply packets can be received in first information processor 1. When the NAT used in first communication control unit 3 is AS filter, since the bubble packet is transmitted to second communication control unit 4, all reply packets can be received in first information processor 1. When the NAT assigning rule used in first communication control unit 3 is cone or address sensitive, first information processor 1 can transmit the re-reply packet to the received reply packet by using bubble packet transmitting port P13. Therefore, when the NAT filter used in first communication control unit 3 is no filter or AS filter, and the port assigning rule is cone or address sensitive, regardless of the type of second communication control unit 4, only if the position of bubble packet transmitting port P13 can be known accurately, connection of first information processor 1 and second information processor 2 can be realized securely.

Hence, as shown in FIG. 17, according to the communication system of the preferred embodiment, communication can be established regardless of the type of NAT used in first communication control unit 3 and second communication control unit 4. As a result, without having to judge the type of NAT used in first communication control unit 3 and second communication control unit 4, communication between first information processor 1 and second information processor 2 can be established. In particular, if the combination of NATs is particular, if the reply packet is transmitted without using bubble packet transmitting target port, as far as the position of the bubble packet transmitting port can be detected correctly, communication can be established between first information processor 1 and second information processor 2 can be (in the case of ⊚ mark in FIG. 17). Otherwise (◯ mark in FIG. 17), if the position of bubble packet transmitting port can be detected correctly, communication cannot be established unless the reply packet is transmitted by using bubble packet transmitting target port. In such a case, the process for establishing communication is repeated until the reply packet can be transmitted by using the bubble packet transmitting target port. As shown in FIG. 17, first communication control unit 3 and second communication control unit 4 may use open NAT (not using NAT).

Preferred Embodiment 2

A communication system in preferred embodiment 2 of the invention is described while referring to the accompanying drawings. The communication system of the preferred embodiment is intended to lessen the processing load of the server, by detecting the bubble packet transmitting port or detecting the port number differential by the information processor, not by the server.

The configuration of the communication system of the preferred embodiment is same as shown in FIG. 1, except that first information processor 10, second information processor 20, and server 60 are provided respectively instead of first information processor 1, second information processor 2, and server 6, and its explanation is omitted.

Figure 18:
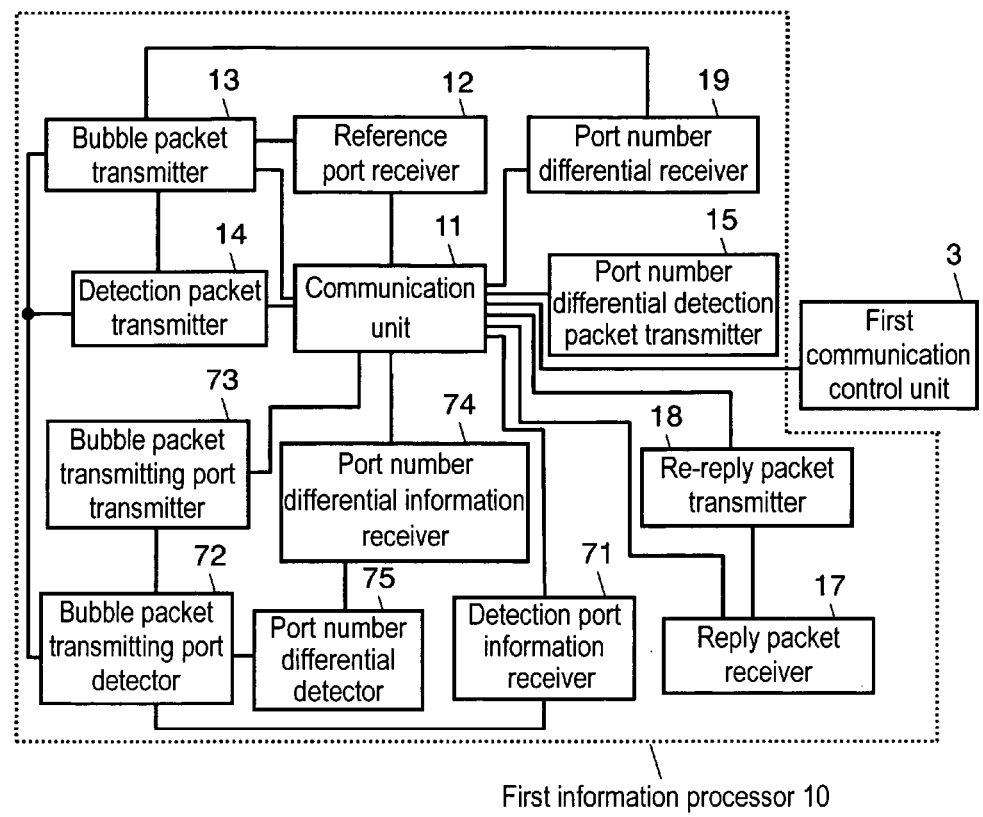
FIG. 18 is a block diagram of configuration of first information processor in preferred embodiment 2 of the invention.

FIG. 18 is a block diagram of configuration of first information processor 10 in the preferred embodiment. In FIG. 18, first information processor 10 comprises communication unit 11, reference port receiver 12, bubble packet transmitter 13, detection packet transmitter 14, port number differential detection packet transmitter 15, reply packet receiver 17, re-reply packet transmitter 18, port number differential receiver 19, detection port information receiver 71, bubble packet transmitting port detector 72, bubble packet transmitting port transmitter 73, port number differential information receiver 74, and port number differential detector 75. The structure and operation of other parts than detection port information receiver 71, bubble packet transmitting port detector 72, bubble packet transmitting port transmitter 73, port number differential information receiver 74, and port number differential detector 75 are same as in preferred embodiment 1, except that port number differential detector 19 receives the port differential information transmitted from second information processor 20 by way of server 60, and the explanation is omitted.

Detection port information receiver 71 receives detection port information sent from server 60 by way of communication unit 11. The detection port information is the information showing the position of the port of first communication control unit 3 allowing to pass the port detection packet sent from detection packet transmitter 14.

Bubble packet transmitting port detector 72 detects the position of bubble packet transmitting port on the basis of detection port information received in detection port information receiver 71. Bubble packet transmitting port detector 72 detects the position of bubble packet transmitting port by using the port number differential in first communication control unit 3 detected by port number differential detector 75. The position of bubble packet transmitting port is detected same as in bubble packet transmitting port detector 65 in preferred embodiment 1, and its explanation is omitted. If failing to detect the position of bubble packet transmitting port, bubble packet transmitting port detector 72 transfers a re-send instruction of port detection packet to detection packet transmitter 14, and a re-send instruction of bubble packet is transferred to bubble packet transmitter 13. As a result, detection packet transmitter 14 sends again the port detection packet according to the instruction. Bubble packet transmitter 13 sends the bubble packet again according to the instruction. This re-transmission is repeated until bubble packet transmitting port detector 72 detects the position of bubble packet transmitting port, or by a specified limit, such as by a specified number of times (for example, 10 times) or for a specified duration (for example, 30 seconds).

Bubble packet transmitting port transmitter 73 transmits the bubble packet transmitting port information showing the position of bubble packet transmitting port detected by bubble packet transmitting port detector 72 to second information processor 20 by way of server 60.

Port number differential information receiver 74 receives port differential information. The port differential information is the information showing the position of port in first communication control unit 3 allowing to pass the port number differential detection packet transmitted by port number differential detection packet transmitter 15. The port differential information is transmitted from server 60.

Port number differential detector 75 detects the port number differential in first communication control unit 3 on the basis of port differential information received in port number differential information receiver 74. Detection of port number differential is same as in port number differential detector 64 in preferred embodiment 1, and its explanation is omitted.

Figure 19:
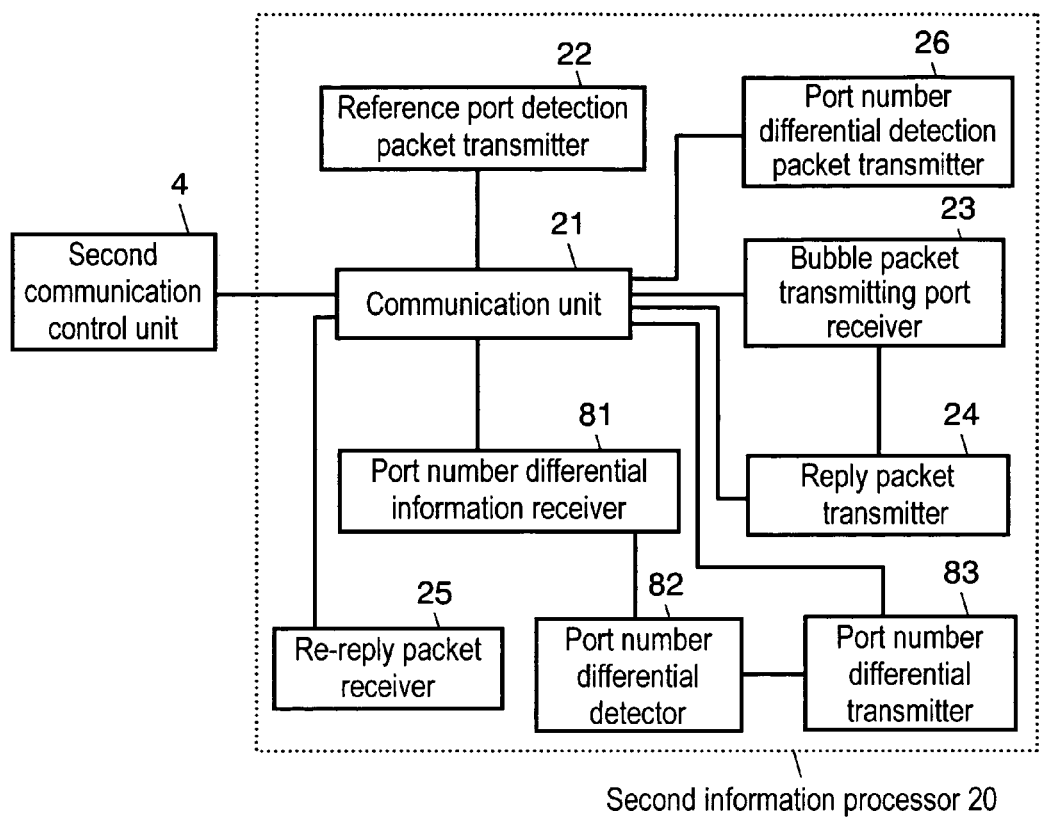
FIG. 19 is a block diagram of configuration of second information processor in the preferred embodiment.

FIG. 19 is a block diagram of configuration of second information processor 20 in this preferred embodiment. In FIG. 19, second information processor 20 comprises communication unit 21, reference port detection packet transmitter 22, bubble packet transmitting port receiver 23, reply packet transmitter 24, re-reply packet receiver 25, port number differential detection packet transmitter 26, port number differential information receiver 81, port number differential detector 82, and port number differential transmitter 83. The structure and operation of other parts than port number differential information receiver 81, port number differential detector 82, and port number differential transmitter 83 are same as in preferred embodiment 1, and the explanation is omitted.

Port number differential information receiver 81 receives port differential information. The port differential information is the information showing the position of port in second communication control unit 4 allowing to pass the port number differential detection packet transmitted by port number differential detection packet transmitter 26. The port differential information is transmitted from server 60.

Port number differential detector 82 detects the port number differential in second communication control unit 4 on the basis of port differential information received in port number differential information receiver 81. Detection of port number differential is same as in port number differential detector 64 in preferred embodiment 1, and its explanation is omitted.

Port number differential transmitter 83 transmits the port number differential information as the information showing the port number differential in second communication control unit 4 detected by port number differential detector 82 to first information processor 10 by way of server 60.

Figure 20:
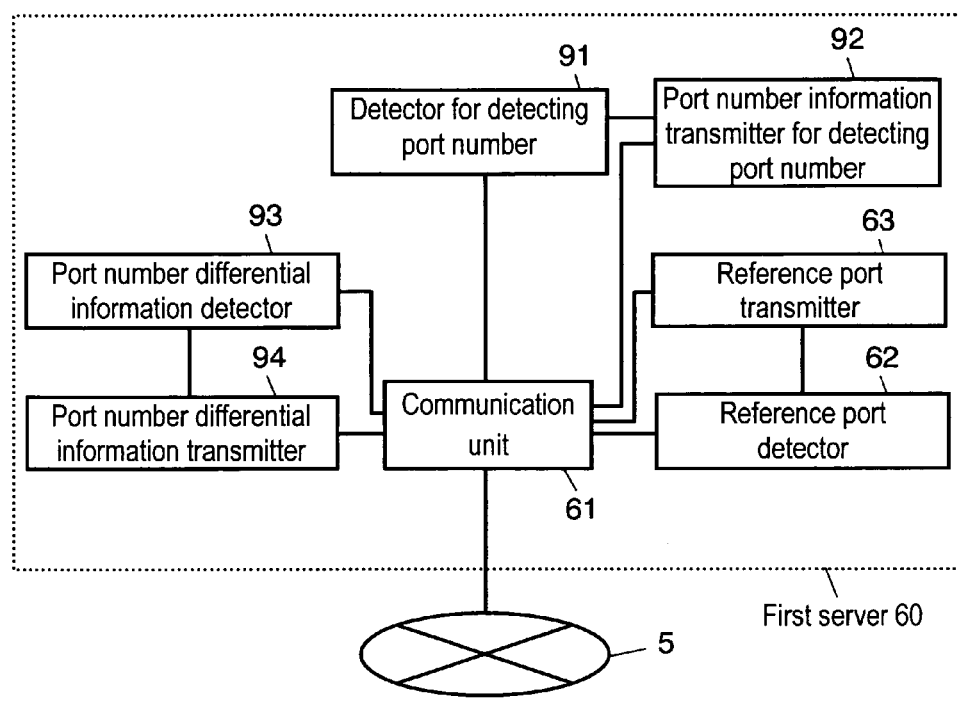
FIG. 20 is a block diagram of configuration of server in the preferred embodiment.

FIG. 20 is a block diagram of configuration of server 60 in the preferred embodiment. In FIG. 20, server 60 comprises communication unit 61, reference port detector 62, reference port transmitter 63, detector for detecting port number 91, port number information transmitter for detecting port number 92, port number differential information detector 93, and port number differential information transmitter 94. The structure and operation of other parts than detector for detecting port number 91, port number information transmitter for detecting port number 92, port number differential information detector 93, and port number differential information transmitter 94 are same as in preferred embodiment 1, and the explanation is omitted.

Detector for detecting port number 91 receives the port detection packet transmitted from first information processor 10, and detects the position of the port of first communication control unit 3 allowing to pass the port detection packet on the basis of the port detection packet. The port position is detected by acquiring the position of the port of first communication control unit 3 allowing to pass the port detection packet included in the port detection packet (for example, included in the header of port detection packet).

Port number information transmitter for detecting port number 92 transmits the detection port information showing the position of the port detected by detector for detecting port number 91 to first information processor 10.

Port number differential information detector 93 receives the port number differential detection packet sent from first information processor 10 by way of first communication control unit 3, and detects the position of port of first communication control unit 3 allowing to pass the port number differential detection packet on the basis of the port number differential detection port. Port number differential information detector 93 further receives the port number differential detection packet sent from second information processor 20 by way of second communication control unit 4, and detects the position of port of second communication control unit 4 allowing to pass the port number differential detection packet on the basis of the port number differential detection port.

Port number differential information transmitter 94 transmits port differential information showing the position of the port of first communication control unit 3 allowing to transmit the port number differential detection packet transmitted by port number differential information detector 93 to first information processor 10. Port number differential information transmitter 94 further transmits port differential information showing the position of the port of second communication control unit 4 allowing to transmit the port number differential detection packet transmitted by port number differential information detector 93 to second information processor 20.

It may also comprise a first detector for detecting port number for detecting the position of the port in first communication control unit 3 allowing to pass the port number differential detection packet, and a second detector for detecting port number for detecting the position of the port in second communication control unit 4 allowing to pass the port number differential detection packet. Similarly it may also comprises a first port number information transmitter for port differential detection for transmitting the port differential information showing the position of the port in first communication control unit 3 allowing to pass the port number differential detection packet to first information processor 10, and a second port number information transmitter for port differential detection for transmitting the port differential information showing the position of the port in second communication control unit 4 allowing to pass the port number differential detection packet to second information processor 20. They are realized by one component each, that is, port number differential information detector 93 and port number differential information transmitter 94. That is, of port number differential information detector 93, the portion for detecting the position of the port in first communication control unit 3 allowing to pass the port number differential detection packet is the firs detector for detecting port number, and the portion for detecting port number for detecting the position of the port in second communication control unit 4 allowing to pass the port number differential detection packet is the second detector for detecting port number. Similarly, of port number differential information transmitter 94, the portion for transmitting the port differential information showing the position of the port in first communication control unit 3 allowing to pass the port number differential detection packet to first information processor 10 is the first port number information transmitter for port differential detection, and the portion for transmitting the port differential information showing the position of the port in second communication control unit 4 allowing to pass the port number differential detection packet to second information processor 20 is the second port number information transmitter for port differential detection.

The operation of communication system of the preferred embodiment is explained. The operation of the communication system in the preferred embodiment is same as the operation in preferred embodiment 1 shown in FIG. 5 up to the process of start of communication, except that the bubble packet transmitting port is detected and the re-send of bubble packet is instructed in first information processor 10, and the explanation is omitted.

Figure 21:
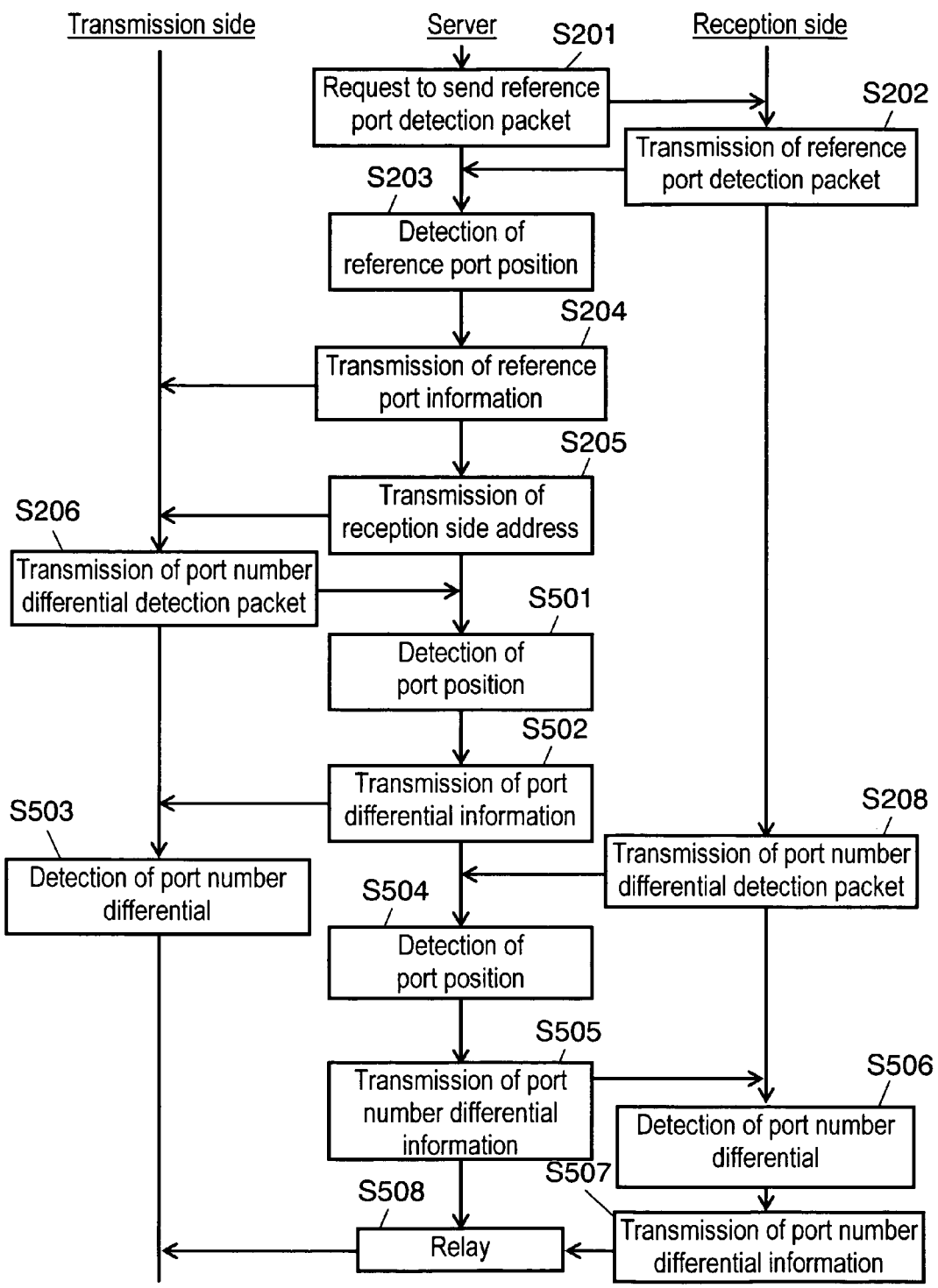
FIG. 21 is an explanatory diagram of process of establishment of communication in the preferred embodiment.

In the flowchart in FIG. 5, the process at step S101 is explained by referring to FIG. 21. FIG. 21 is a diagram for explaining the exchange and processing of information among the transmission side, servers, and reception side. Process at steps S201 to S206 is same as explained in FIG. 6 in preferred embodiment 1, and the explanation is omitted.

(Step S501) Port number differential information detector 93 of server 60 receives a port number differential detection packet transmitted from first information processor 10. Port number differential information detector 93 detects the position of the port of first communication control unit 3 allowing to pass this port number differential detection packet included in the header of the port number differential detection packet.

(Step S502) Port number differential information transmitter 94 transmits the port differential information which is the information showing the position of the port of first communication control unit 3 allowing to pass the port number differential detection packet detected by port number differential information detector 93, to first information processor 10. This port differential information is received in port number differential information receiver 74 in first information processor 10.

(Step S503) Port number differential detector 75 detects the port number differential of first communication control unit 3 on the basis of port differential information received in port number differential information receiver 74. This detection of port number differential is same as in preferred embodiment 1, and its explanation is omitted.

(Step S504) Port number differential information detector 93 of server 60 receives a port number differential detection packet transmitted from second information processor 20. Port number differential information detector 93 detects the position of the port of second communication control unit 4 allowing to pass this port number differential detection packet included in the header of the port number differential detection packet.

(Step S505) Port number differential information transmitter 94 transmits the port differential information which is the information showing the position of the port of second communication control unit 4 allowing to pass the port number differential detection packet detected by port number differential information detector 93, to second information processor 20. This port differential information is received in port number differential information receiver 81 in second information processor 20.

(Step S506) Port number differential detector 82 detects the port number differential of second communication control unit 4 on the basis of port differential information received in port number differential information receiver 81. This detection of port number differential is same as in preferred embodiment 1, and its explanation is omitted.

(Step S507) Port number differential information transmitter 83 transmits the port number differential information as the information showing the port number differential of second communication control unit 4 to server 60, together with an instruction for transmitting this port number differential information to first information processor 10.

(Step S508) Communication unit 61 of server 60 receives the port number differential information, and transmits this port number differential information to first information processor 10. This port number differential information is received in port number differential receiver 19 in first information processor 10.

Figure 22:
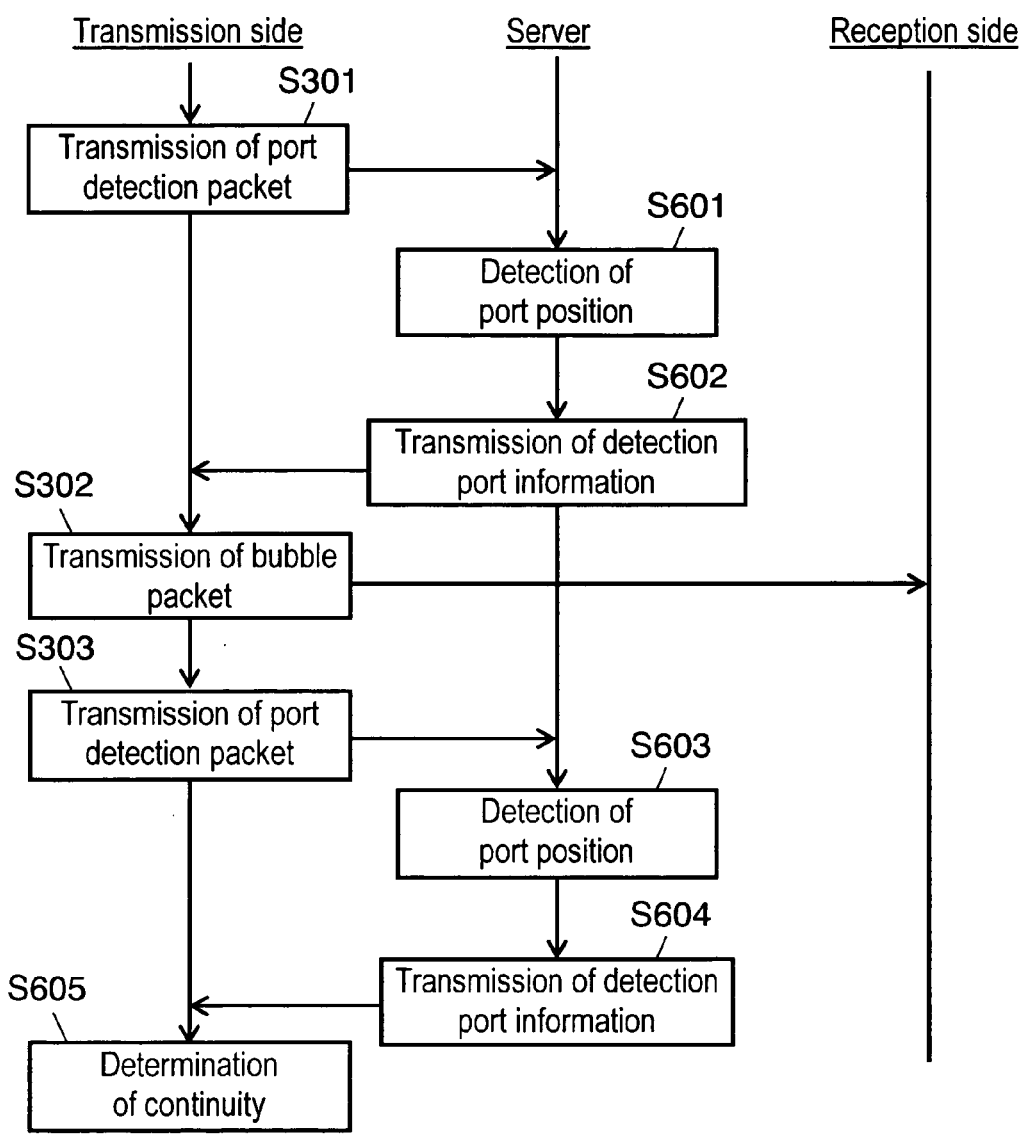
FIG. 22 is an explanatory diagram of process of establishment of communication in the preferred embodiment.

In the flowchart in FIG. 5, the process at step S102 is explained by referring to FIG. 22. FIG. 22 is a diagram for explaining the exchange and processing of information among the transmission side, servers, and reception side. Process at steps S301 to S303 is same as explained in FIG. 8 in preferred embodiment 1, except that the port detection packet is received in detector for detecting port number 91 in server 60, and the explanation is omitted.

(Step S601) Detector for detecting port number 91 of server 60 receives a port detection packet transmitted from first information processor 10. Detector for detecting port number 91 detects the position of port of first communication control unit 3 allowing to pass the port detection packet included in the header of the port detection packet.

(Step S602) Port number information transmitter for detecting port number 92 transmits the detection port information showing the position of port of first communication control unit 3 allowing to pas the port detection packet, detected by detector for detecting port number 91, to first information processor 10. The detection port information is received in detection port information receiver 71 in first information processor 10.

(Step S603) Detector for detecting port number 91 of server 60 receives a port detection packet transmitted from first information processor 10. Detector for detecting port number 91 detects the position of port of first communication control unit 3 allowing to pass the port detection packet included in the header of the port detection packet.

(Step S604) Port number information transmitter for detecting port number 92 transmits the detection port information showing the position of port of first communication control unit 3 allowing to pas the port detection packet, detected by detector for detecting port number 91, to first information processor 10. The detection port information is received in detection port information receiver 71 in first information processor, 10.

(Step S605) Bubble packet transmitting port detector 72 of first information processor 10 judges if the positions of ports of first communication control unit 3 used in transmission of two port detection packets at steps S301, S033, and the bubble packet transmitting port are consecutive or not. The specific judging method is same as in preferred embodiment 1, and its explanation is omitted.

In the flowchart in FIG. 22, first information processor 10 transmits the bubble packet after receiving the detection port information transmitted at step S602, but the sequence of reception of detection port information and transmission of bubble packet is not specified. For example, after transmission of second port detection packet (step S303), transmission of first detection port information (step S602) and transmission of second detection port information (step S604) may be executed. Or the detection port information showing the port positions detected at steps S601, S603 may be transmitted in batch.

Figure 23:
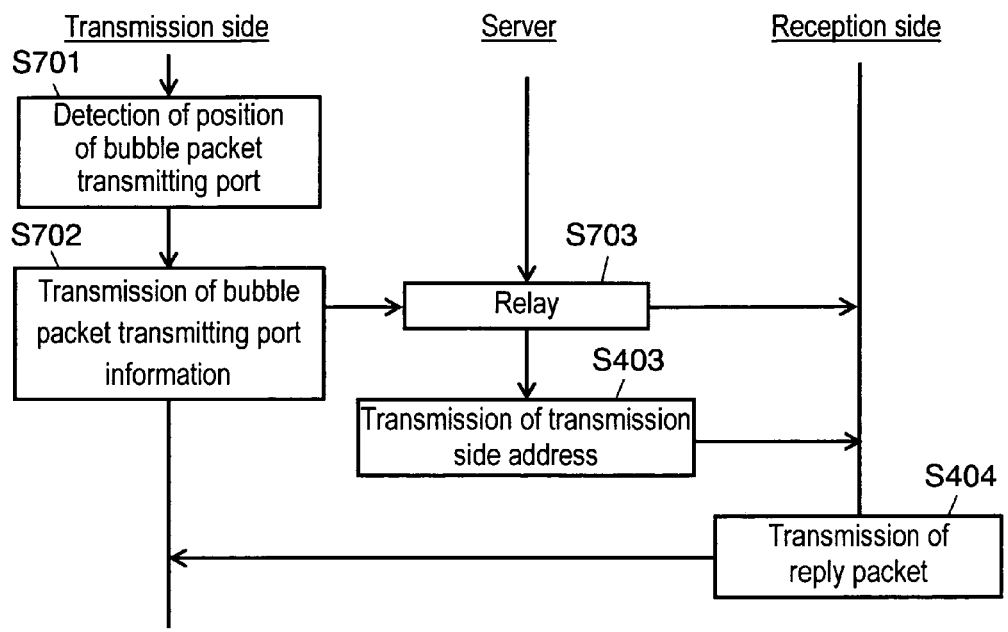
FIG. 23 is an explanatory diagram of process of establishment of communication in the preferred embodiment.

In the flowchart in FIG. 5, the process at step S104 is explained by referring to FIG. 23. FIG. 23 is a diagram for explaining the exchange and processing of information among the transmission side, servers, and reception side. Process at steps S403 and S404 is same as explained in FIG. 9 in preferred embodiment 1, and the explanation is omitted.

(Step S701) Bubble packet transmitting port detector 72 of first information processor 10 detects the position of bubble packet transmitting port. Specific judging method is same as in preferred embodiment 1, and the explanation is omitted.

(Step S702) Bubble packet transmitting port transmitter 73 of first information processor 10 transmits the bubble packet transmitting port information to server 60, together with an instruction of transmitting the bubble packet transmitting port information to second information processor 20.

(Step S703) Communication unit 61 of server 60 receives the bubble packet transmitting port information, and transmits the bubble packet transmitting port information to second information processor 20. This bubble packet transmitting port information is received in bubble packet transmitting port receiver 23 in second information processor 20.

In specific examples of operation of communication system of the preferred embodiment, the port number differential in first communication control unit 3 and second communication control unit 4 is detected respectively in first information processor 10 and second information processor 20, the position of the bubble packet transmitting port is detected by first information processor 10, and accompanying processes are done (for example, transmission of bubble packet transmitting port information from first information processor 10 to second information processor 20), and other operations are same as in preferred embodiment 1, and the explanation is omitted.

Hence, in the communication system in the preferred embodiment, in addition to the same effects as in preferred embodiment 1, detection of port number differential in first communication control unit 3 or second communication control unit 4, or detection of position of bubble packet transmitting port is done in first information processor 10 or second information processor 20, so that the processing load in server 60 can be saved. In particular, since the processing load is heavy in waiting process (such as process of waiting for transmission of second port detection packet after transmission of first port detection packet), such waiting process is not done in the server, so that the processing load of server 60 may be substantially lessened.

In this preferred embodiment, detection of port number differential of first communication control unit 3 is done in first information processor 10, but first information processor 10 may detect the bubble packet transmitting port and transmit the bubble packet transmitting port, while detection of port within first communication control unit 3 may be done in the server same as in preferred embodiment 1. Similarly, either detection of port number differential of second communication control unit 4, or detection of bubble packet transmitting port may be done in the server same as in preferred embodiment 1.

In the preferred embodiment, the port number differential in second communication control unit 4 is detected in second information processor 20, but the port number differential in second communication control unit 4 may be detected in first information processor 10. In this case, it is not required to transmit the information of port number differential from second information processor 20 to first information processor 10 by way of server 60. In this case, the port differential information showing the position of the port in second communication control unit 4 allowing to pass the port number differential detection packet sent from second information processor 20 is transmitted to first information processor 10 from server 60.

In the preferred embodiment, the bubble packet transmitting port is detected in first information processor 10, but the bubble packet transmitting port may be detected in second information processor 20. In this case, it is not required to transmit the bubble packet transmitting port information from first information processor 10 to second information processor 20 by way of server 60. In this case, the detection port information showing the position of the port in first communication control unit 3 allowing to pass detection packet sent from first information processor 10 is transmitted to second information processor 20 from server 60. Also in this case, the port number differential in first communication control unit 3 may be detected in second information processor 20.

In the preferred embodiment, the reference port information is transmitted from server 60 to first information processor 10, but the reference port information may be also transmitted to second information processor 20 which has transmitted the reference port detection packet. In this case, the reference port information is transmitted again from second information processor 20 to first information processor 10 by way of server 60.

In the preferred embodiment, the port number differential detection packet, reference port detection packet, and port detection packet include information (for example, device ID or IP address) for specifying the information processor for transmitting the information showing the position of the port in the communication control unit allowing to pass these packets, and server 60 may transmit the information showing the position of the detected port on the basis of such information. For example, the port number differential detection packet sent from port number differential detection packet transmitter 15 includes the device ID of first information processor 10, and port number differential information transmitter 94 may transmit the port differential information to first information processor 10 corresponding to this device ID.

Preferred Embodiment 3

A communication system in preferred embodiment 3 of the invention is described while referring to the accompanying drawings. The communication system in the preferred embodiment is characterized by that one information processor communicates directly without resort to communication control unit.

Figure 24:
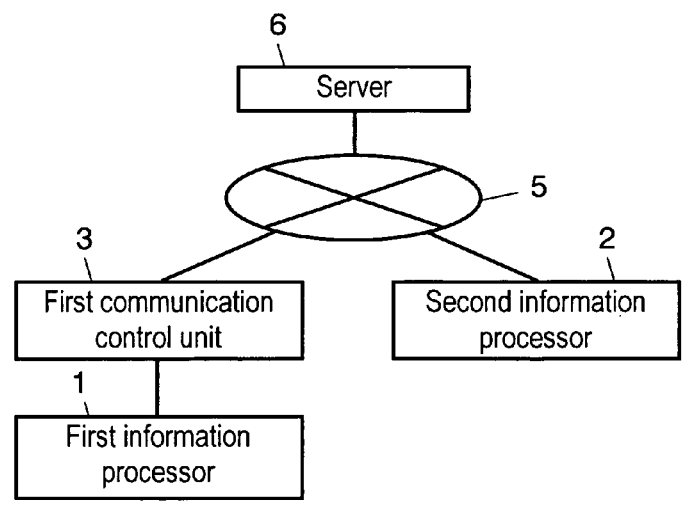
FIG. 24 is a block diagram of configuration of communication system in preferred embodiment 3 of the invention.

FIG. 24 is a block diagram of configuration of communication system in the preferred embodiment. In FIG. 24, the communication system in the preferred embodiment comprises first information processor 1, second information processor 2, first communication control unit 3, and server 6. The communication system in the preferred embodiment shown in FIG. 24 is same as the communication system in preferred embodiment 1, except that second communication control unit is not provided. The structure and operation of first information processor 1, second information processor 2, and server 6 are same as in preferred embodiment 1, and the detailed description is omitted.

Herein, since second information processor 2 is intended to communicate without resort to communication control unit, second information processor 2 is assumed to be communicating as if by way of communication control unit of full cone NAT. Therefore, the operation in this preferred embodiment is same as operation in the case of second communication control unit 4 operating on full cone NAT in preferred embodiment 1, and communication between first information processor 1 and second information processor 2 can be established. (In FIG. 17, the case of NAT of one side being open NAT corresponds to this preferred embodiment.)

Thus, in the communication system of the preferred embodiment, if second information processor 2 communicates without resort to communication control unit, communication between first information processor 1 and second information processor 2 can be established.

This preferred embodiment is similar to the communication system in preferred embodiment 1 except that second communication control unit is not provided, but it is similarly realized in the communication system in preferred embodiment 2 excluding second communication control unit. Thus, if the second information processor communicates without resort to communication control unit, communication between first information processor 1 and second information processor 2 can be established.

Or, in the preferred embodiment, second information processor 2 communicates without resort to communication control unit, but if second information processor 2 communicates by way of communication control unit, and first information processor 1 communicates without resort to communication control unit, similarly, communication between first information processor 1 and second information processor 2 can be established.

Figure 25:
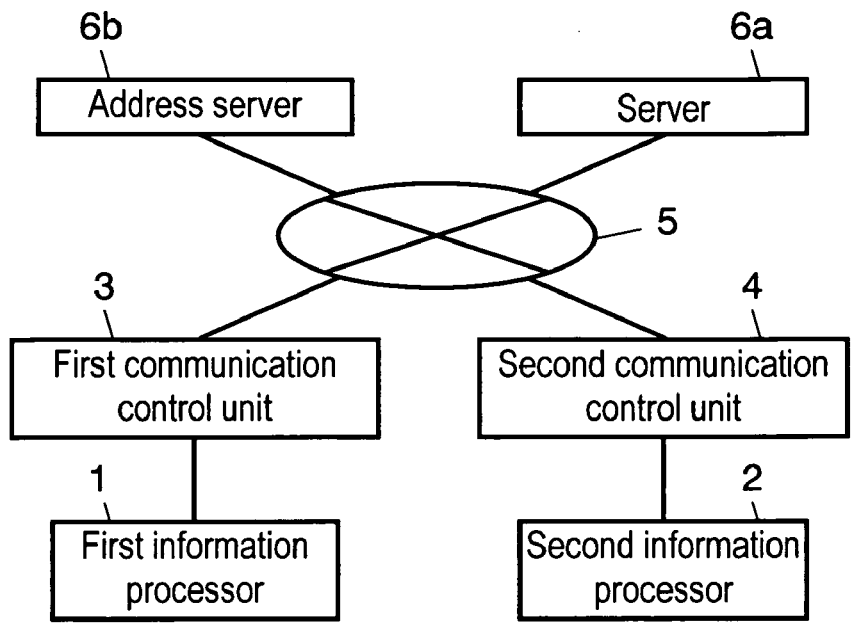
FIG. 25 is a block diagram of configuration of communication system in other example of the preferred embodiment.

In the explanation of the foregoing preferred embodiments, the servers 6, 60 have the function of informing the information process of the IP address of the communication control unit of the partner side, but this function may be realized by other server than server 6, etc. That is, the server for informing one information process of the address of other communication control unit may be different from the server for processing detection of bubble packet transmitting port and others. Therefore, in the communication system shown in FIG. 25, first information processor 1 and second information processor 2 may acquire the addresses of first communication control unit 3 and second communication control unit 4 from address server 6b, and server 6a may be used in process of establishing communication between information processors.

SIP (session initiation protocol) may be used in the process of informing one information processor of address of other communication control unit (or information processor if communication control unit is not provided), or the process of calling the partner side (receiving side) information processor from the sending/calling side information processor.

In the foregoing preferred embodiments, the reference port is the latest assigned port at the time of transmission of reference port detection packet, but the reference port may not be always the latest assigned port. For example, when the devices connected to second communication control unit 4 are second information processors 2, 20 only, and the number of ports used in second communication control unit 4 can be approximately known, the port of second communication control unit 4 used in communication with servers 6, 60 may be used as reference port. In this case, the reference port detection packet is the packet communicating with servers 6, 60.

In the foregoing preferred embodiments, the port detection packet is transmitted twice before and after transmission of bubble packet, but the port detection packet may be transmitted only once either before or after transmission of bubble packet. In this case, the bubble packet transmitting port is detected by assuming that the bubble packet transmitting port and the port of first communication control unit 3 used in transmission of port detection packet are consecutive. If this assumption is wrong, the reference port detection packet cannot be transmitted again (process from step S101 is repeated).

In the foregoing preferred embodiments, the position of bubble packet transmitting port is detected after judging if the position of bubble packet transmitting port can be detected or not by bubble packet transmitting port detectors 65, 72, but in a specified case, without such judging step, the position of bubble packet transmitting port can be detected. The specified case is, for example, a case in which nothing other than first information processors 1, 10 is connected to first communication control unit 3, and it is highly possible that the bubble packet transmitting port and the port of first communication control unit 3 used in transmission of port detection packet are consecutive. In this case, if the detected position of bubble packet transmitting port is wrong, as far as the type of NAT used in first communication control unit 3 is as specified, reply packet is not received in first information processors 1, 10, and the process is repeated from the step of transmission of reference port detection packet.

In bubble packet transmitting port detectors 65, 72, if it is judged that the bubble packet transmitting port and the port of first communication control unit 3 used in transmission of port detection packet are not consecutive, as explained in the foregoing preferred embodiments, a re-send instruction may be transmitted to first information processor 1, or re-send may be instructed to bubble packet transmitter 13 or the like, or process of establishment of communication may be terminated, and process from transmission of reference port detection packet may be repeated.

In bubble packet transmitting port detectors 65, 72, if it may be also judged that the bubble packet transmitting port and the port of first communication control unit 3 used in transmission of port detection packet are consecutive when the probability of continuity is high. For example, when the port number differential of first communication control unit 3 changes between 1 and 2 (for example, when changing in time), possibility of continuity is high when the port interval of first communication control unit 3 used in transmission of port detection packet is 2, 3, 4, and it may be judged to be consecutive, and the process may be advanced to next step. In this case, too, if the port interval of first communication control unit 3 used in transmission of port detection packet is 5, it is judged not consecutive.

In the foregoing preferred embodiments, the port number differential is detected by port number differential detectors 64, 75, 82, but the port number differential may be also transferred to servers 6, 60 or first information processors 1, 10 by manual input by user, specified recording medium (for example, CD-ROM or detachable memory), or communication, or the port number differential stored in first communication control unit 3 or the like may be acquired. The same is said of acquisition of IP address of second communication control unit 4 or the like by first information processors 1, 10, etc. That is, the IP address may be entered in first information processors 1, 10, etc. by manual input by user, etc.

In the foregoing preferred embodiments, first information processors 1, 10 transmit the bubble packet and port detection packet by using new ports in first information processors 1, 10, but when first information processor 1 detects NAT of port sensitive port assigning rule is used in first communication control unit 3, first information processors 1, 10 may transmit the bubble packet and port detection packet from the same port of first information processors 1, 10. In this case, transmission destination ports (ports of servers 6, 60) of port detection packet must be mutually different.

In the foregoing preferred embodiments, it is explained that the reply packet is transmitted by using a port in second communication control unit 4 assigned newly when transmitting the reply packet, but this is only an example, and the ports in second communication control unit 4 used in transmission of reply packet may include ports used hitherto, for example, the port used in transmission of reference port detection packet.

The number of ports (α) that can be assigned from reference port to bubble packet transmitting target port can be increased on every occasion of re-transmission of bubble packet, etc. That is, bubble packet transmitter 13 can transmit a bubble packet to the bubble packet transmitting target port apart from the reference port every time the bubble packet is re-transmitted. In this manner, it is easier to avoid use of bubble packet transmitting target port until reply packet is transmitted.

In the foregoing preferred embodiments, reply packet transmitter 24 receives the number of ports (α) that can be assigned from reference port to bubble packet transmitting target port from bubble packet transmitter 13 by way of server 6, but the number of a may be also transmitted to bubble packet transmitter 13 and reply packet transmitter 24 from servers 6, 60 (in this case, the port differential information may not be transmitted to first information processor 1), and the value of α may be preset in first information processors 1, 10 and second information processors 2, 20.

In the foregoing preferred embodiments, reply packet transmitter 24 transmits the reply packets by the number of ports (α) that can be assigned from reference port to bubble packet transmitting target port, but reply packet transmitter 24 may also transmit reply packets by more than α, or transmit reply packets by less than α. For example, reply packet transmitter 24 may not receive the number of α from bubble packet transmitter 13 by way of servers 6, 60, but may receive the difference in port number between reference port and bubble packet transmitting target port, and transmit the reply packets by the number of times corresponding to the value of difference. In this case, reply packet transmitter 24 transmits reply packets by a multiple times of α. As explained in the process about step S209 in FIG. 6, if it is possible that the port number differential in second communication control unit 4 detected by port number differential detectors 68, 82 may be a multiple of actual port number differential, it is better to set the difference in port number between reference port and bubble packet transmitting target port as the number of reply packets. This is because the reply packets can be transmitted more securely by using the bubble packet transmitting target port. Or when second information processors 2, 20 have prior knowledge of the number of ports assigned after assignment of reference port in second communication control unit 4, the reply packets may be transmitted by the number subtracting this number from α. In this case, too, the reply packets can be transmitted by using the bubble packet transmitting target port (however, it is required that the port number differential of second communication control unit 4 should be detected correctly). Therefore, if ports are assigned up to one port before the bubble packet transmitting target port, only one reply packet may be transmitted.

In the foregoing preferred embodiments, after receiving the reply packet, a re-send packet is transmitted, but when communication between first information processors 1, 10 and second information processors 2, 20 can be established by receiving the reply packet, the re-send packet may not be transmitted. For example, when first information processors 1, 10 receive the reply packet transmitted by using the bubble packet transmitting target port, peer-to-peer communication is possible by way of bubble packet transmitting port and bubble packet transmitting target port, and it is not necessary to transmit re-send packet.

In the specific examples of the foregoing preferred embodiments, when reply packet can be received or not is judged by checking if reply packet has been already received when receiving the notice of transmission of reply packet from second information processors 2, 20 by way of servers 6, 60, but it may be judged that the reply packet is not received (that is, communication is not established) when reply packet is not received within specified time (for example, 15 seconds) after transmission of bubble packet. It is same with the re-send packet, and it may be judged that the re-send packet is not received (that is, communication is not established) when re-send packet is not received within specified time after transmission of reply packet.

In the foregoing preferred embodiments, reference port information is transmitted or the bubble packet transmitting port is detected by one server, 6 or 60, but these processes may be done by plural servers.

Preferred Embodiment 4

A communication system in preferred embodiment 4 of the invention is described while referring to the accompanying drawings. The communication system in the preferred embodiment refers to communication by SIP, by using the detecting method of position of bubble packet transmitting port explained in the foregoing preferred embodiments.

Figure 26:
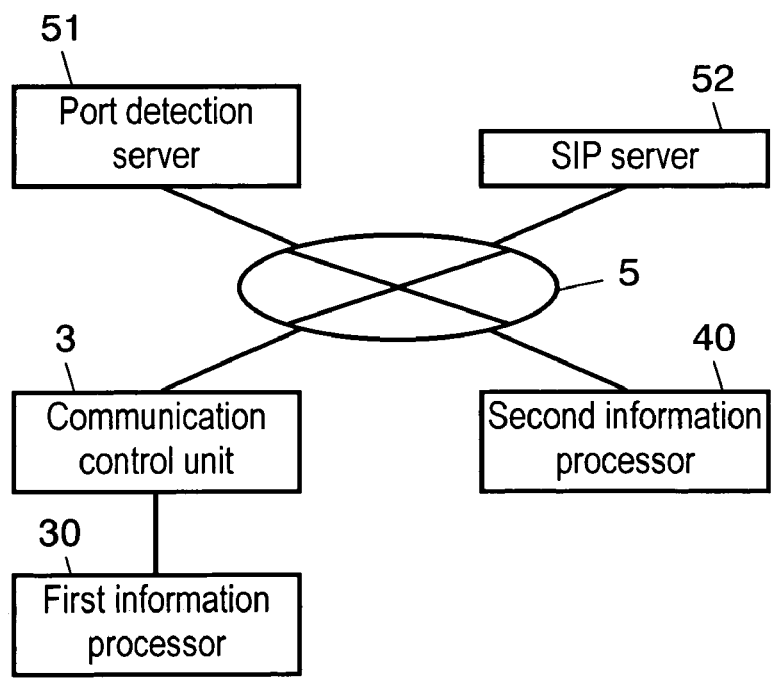
FIG. 26 is a block diagram of configuration of communication system in preferred embodiment 4 of the invention.

FIG. 26 is a block diagram of configuration of communication system in the preferred embodiment. In FIG. 26, the communication system in the preferred embodiment comprises first information processor 30, communication control unit 3, second information processor 40, port detection server 51, and SIP server 52. Communication control unit 3 has the NAT function, and is responsible for conversion of address, assignment of port, and filtering of packet, same as first communication control unit 3 in the foregoing preferred embodiments, and its explanation is omitted.

Figure 27:
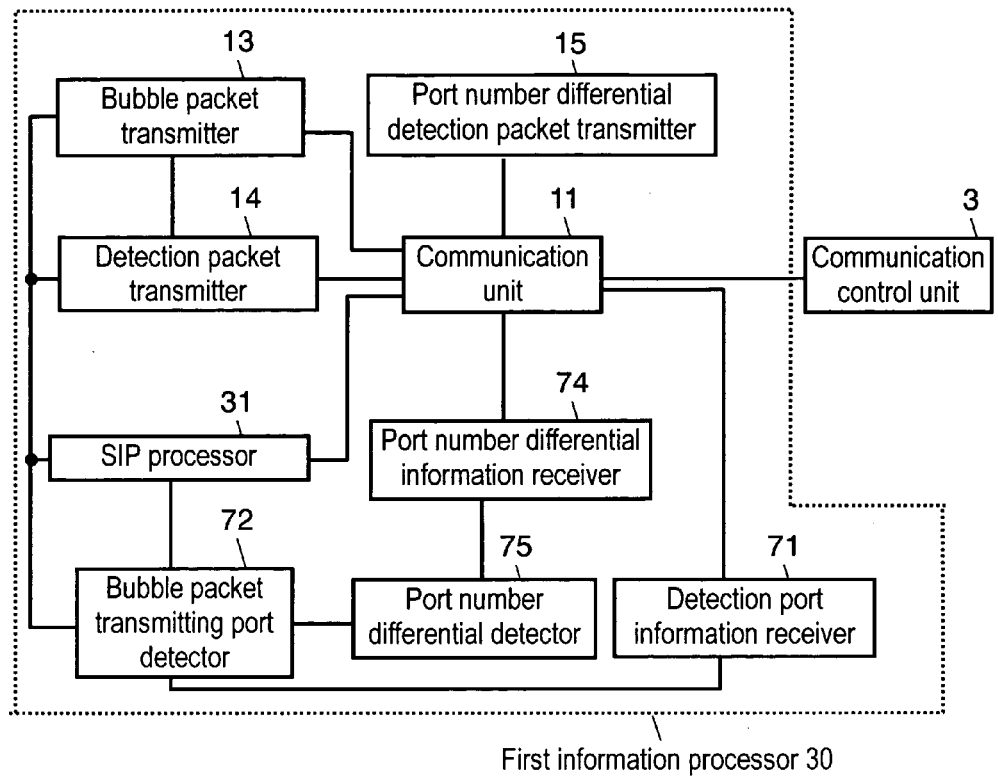
FIG. 27 is a block diagram of configuration of first information processor in the preferred embodiment.

FIG. 27 is a block diagram of configuration of first information processor 30 in the preferred embodiment. In FIG. 27, first information processor 30 comprises communication unit 11, bubble packet transmitter 13, detection packet transmitter 14, port number differential detection packet transmitter 15, detection port information receiver 71, bubble packet transmitting port detector 72, port number differential information receiver 74, port number differential detector 75, and SIP processor 31. The structure and operation of other parts than SIP processor 31 are same as in preferred embodiment 2, and the explanation is omitted. However, bubble packet transmitter 13 does not transmit the bubble packet on the basis of the position of reference port indicated by the reference port information received in reference port receiver 12, but transmits the bubble packet to the bubble packet transmitting target port on the basis of the information showing the position of bubble packet transmitting port received in SIP processor 31.

SIP processor 31 processes about SIP. More specifically, together with SIP server 52, transmission of connection request and acquisition of communication partner address and port number are processed. These processes are same as conventional processes, and the explanation is omitted.

Second information processor 40 is a terminal device (for example, VoIP telephone terminal) for making peer-to-peer voice communication with other client terminal. Second information processor 40 tells the IP address of second information processor 40, position of transmitting port, and position of receiving port to other client terminal by way of SIP server 52, and also receives the receiving port of other client terminal through SIP server 52, and the packet transmission destination can be set in this receiving port in peer-to-peer voice communication. The transmitting port of client terminal is the port of the client terminal for transmitting information to other client terminal. The receiving port of client terminal is the port of the client terminal for receiving information from other client terminal. Second information processor 40 is a general client terminal of SIP, and its detailed description is omitted.

Figure 28:
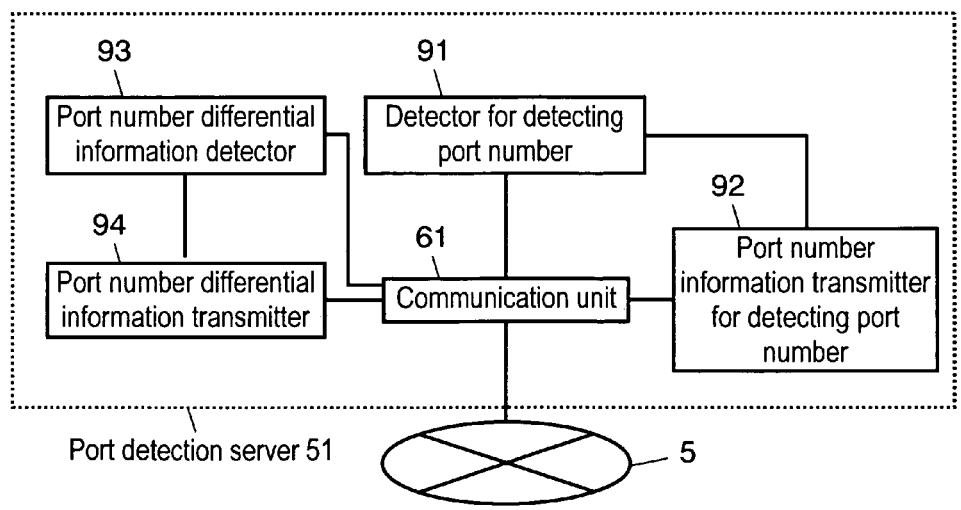
FIG. 28 is a block diagram of configuration of server in the preferred embodiment.

FIG. 28 is a block diagram of configuration of port detection server 51 in the preferred embodiment. In FIG. 28, port detection server 51 processes to detect the position of the port of communication control unit 3 allowing to pass the bubble packet transmitted from first information processor 30. Port detection server 51 comprises communication unit 61, detector for detecting port number 91, port number information transmitter for detecting port number 92, port number differential information detector 93, and port number differential information transmitter 94. The structure and operation of these parts are same as in preferred embodiment 2, and the explanation is omitted.

SIP server 52 is a server for processing about SIP. Process about SIP includes, for example, register process of receiving address notice from client and registering address, location service process of managing the address of client, and proxy server process of receiving call request from client, searching destination address of location service, and transferring to destination client. These functions of SIP server 52 may be realized by two or more servers. The SIP server may be provided individually at first information processor 30 side and second information processor 40 side. In this case, the information is relayed from first information processor 30 to second information processor 40 in the route of, for example, first information processor 30, first SIP server, second SIP server, and second information processor 40. Processing of SIP server 52 is same as in the conventional process, and the detailed description is omitted.

Figure 29:
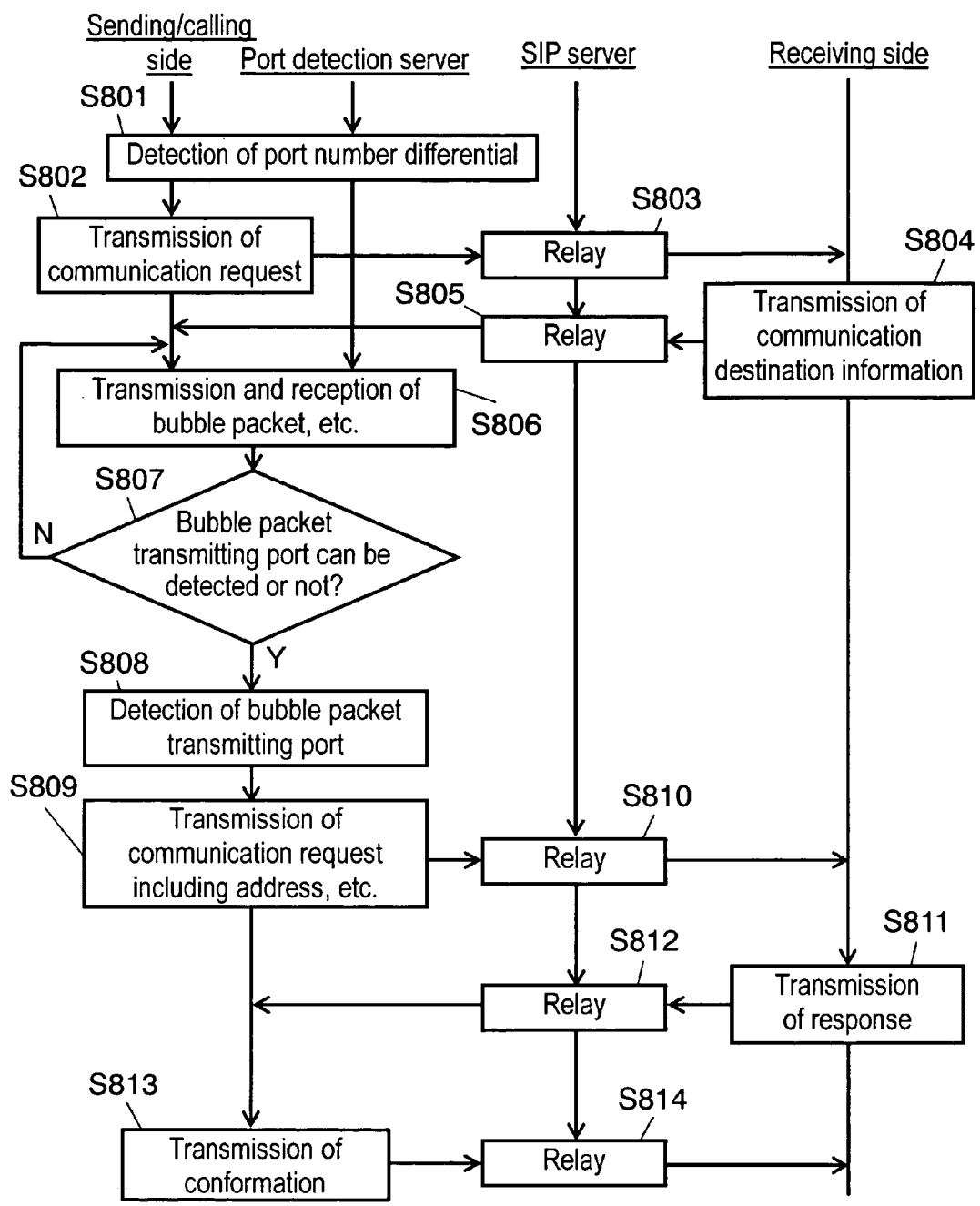
FIG. 29 is an explanatory diagram of process of establishment of communication in the preferred embodiment.
Figure 30:
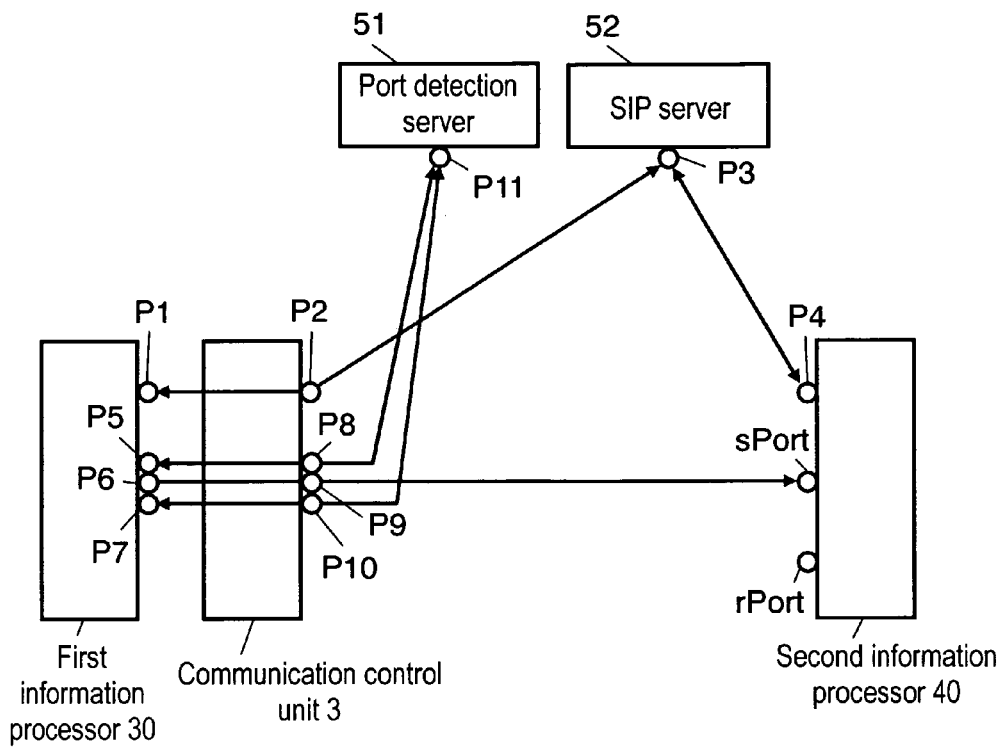
FIG. 30 is an explanatory diagram of specific example in the preferred embodiment.

The operation of communication system of the preferred embodiment is explained. FIG. 29 is an explanatory diagram of exchanging and processing of information among sending/calling side, port detection server 51, SIP server 52, and receiving side. In FIG. 29, first information processor 30 and communication control unit 3 are at the sending/calling side, and second information processor 40 is at receiving side.

(Step S801) By transmitting and receiving specified packet between first information processor 30 at sending/calling side and port detection server 51, the port number differential of sending/calling side communication control unit 3 is detected. Specific process of detection of port number differential is same as at steps S206, S501, S502, and s503 in FIG. 21 of preferred embodiment 2, and the explanation is omitted.

(Step S802) First information processor 30 sends a communication request to request communication with second information processor 40 to SIP server 52. This communication request includes the instruction of transmitting the IP address of communication destination client (that is, second information processor 40), position of transmitting port, and position of receiving port to first information processor 30.

(Step S803) SIP server 52 relays the communication request sent from first information processor 30 to second information processor 40. This communication request is received in second information processor 40.

(Step S804) Second information processor 40 transmits communication destination information including the information showing the IP address of second information processor 40, position of transmitting port, and position of receiving port to SIP server 52.

(Step S805) SIP server 52 relays the communication destination information sent from second information processor 40 to first information processor 30. The communication destination information is received in SIP processor 31 of first information processor 30.

(Step S806) First information processor 30 transmits port detection packet and bubble packet, and receives detection port information from port detection server 51. Specific process of transmitting and receiving bubble packet and others is same as in preferred embodiment 2 in FIG. 22, and the explanation is omitted. In this preferred embodiment, the bubble packet is transmitted to transmitting port of second information processor 40 by using the communication destination information received in SIP processor 31. That is, in this preferred embodiment, the bubble packet transmitting target port is the transmitting port of second information processor 40. To judge continuity (step S605 in FIG. 21), the port number differential of communication control unit 3 detected at step S801 is used.

(Step S807) Bubble packet transmitting port detector 72 of first information processor 30 judges if the position of bubble packet transmitting port can be detected or not. When judging continuity at step S806 (step S605 in FIG. 21), if the ports of communication control unit 3 used in transmission of two port detection packets and the bubble packet transmitting port are judged to be consecutive, it is judged that the position of bubble packet transmitting port can be detected, and the process goes to step S808, or otherwise it is judged that the position of bubble packet transmitting port cannot be detected, and the process returns to step S806.

(Step S808) Bubble packet transmitting port detector 72 detects the position of bubble packet transmitting port. This position of bubble packet transmitting port is the position of the receiving port at the sending/calling side.

(Step S809) SIP processor 31 sends the communication request including the global side IP address of communication control unit 3 and the bubble packet transmitting port detected at step S808 (that is, receiving port) to SIP server 52. The global side IP address of communication control unit 3 is supposed to be acquired preliminarily in processing of detection of port number differential, etc.

(Step S810) SIP server 52 relays the communication request sent from first information processor 30 to second information processor 40. This communication request is received in second information processor 40.

(Step S811) Second information processor 40 transmits the response of completion of preparation for connection to the received communication request.

(Step S812) SIP server 52 relays this response to first information processor 30.

(Step S813) First information processor 30 transmits the confirmation about response received from second information processor 40.

(Step S814) SIP server 52 relays this confirmation to second information processor 40. Thus, preparation for peer-to-peer connection at sending/calling side and receiving side is complete, and when first information processor 30 sends the information to the receiving port of second information processor 40, and second information processor 40 sends the information to receiving port (bubble packet transmitting port) of communication control unit 3, first information processor 30 and second information processor 40 can communicate with each other without resort to relay server such as SIP server 52.

Process sequence of steps in FIG. 29 involves a certain freedom. For example, the process of detection of port number differential at step S801 may be executed after transmission step of communication request (step S802) or transmission process of communication destination information (step S804) as far as it is executed before process of transmission or reception of bubble packet at step S806.

The operation of communication system in the preferred embodiment is described below by referring to a specific example. In the specific example, first information processor 30 and second information processor 40 are supposed to have address information registered preliminarily in SIP server 52. Device ID of first information processor 30 is AAA@abc . . . com, and device ID of second information processor 40 is BBB@abc . . . com. In this specific example, device ID is supposed to be AAA@abc . . . com, but the device ID is not particularly specified in format as far as the information can specify the client terminal, such as mail address or telephone number.

To begin with, first information processor 30 sends a port number differential detection packet to port detection server 51, and detects the port number differential of communication control unit 3 (step S801). Detail of this process is same as in preferred embodiment 2, and the explanation is omitted.

Further, first information processor 30 sends a communication request from port P1 to port P3 of SIP server 52 shown in FIG. 52 (step S802). This communication request is called INVITE request. The communication request includes device ID of first information processor 30 (AAA@abc . . . com) and device ID of second information processor 40 of communication requested partner (BBB@abc . . . com). The communication request includes also an instruction of transmitting the information showing the IP address, position of transmitting port, and position of receiving port. When second information processor 40 receives the communication request, it may be judged to have received the instruction of transmitting the IP address, etc. That is, instruction command may not be included in the communication request.

The communication request is received in SIP server 52. SIP server 52 searches the IP address and port number corresponding to device ID of second information processor 40 (BBB@abc . . . com), and transmits the communication request to the port number of the IP address (step S803).

Second information processor 40, when receiving this communication request, transmits the communication destination information showing the IP address of second information processor 40, position of transmitting port sPort, and receiving port rPort to port P3 of SIP server 52 (step S804). This communication destination information also includes device ID of first information processor 30 and device ID of second information processor 40. In the ordinary SIP, the communication destination information does not include the position of transmitting port of communication destination. Therefore, it is an extension of SIP that the communication destination information includes the position for transmitting port of communication destination.

The communication destination information is received in SIP server 52, and is transmitted to first information processor 30 by way of communication control unit 3 (step S805). The communication destination information is received in SIP processor 31 of first information processor 30. SIP processor 31 transfers the information showing the IP address of second information processor 40 included in the communication destination information and the position of transmitting port sPort to bubble packet transmitter 13.

Later, the bubble packet is transmitted (step S806). More specifically, detection packet transmitter 14 sends the port detection packet to port P11 of port detection server 51 from port P5 newly assigned in first information transmitter 30. The port detection packet is received in detector for detecting port number 91 of port detection server 51, and the port number of port P8 of communication control unit 3 included in the header of port detection packet is detected. Port number information transmitter for detecting port number 92 transmits the detection port information having the port number of port P8 included in the payload to port P8 of communication control unit 3. The detection port information is converted in address in communication control unit 3, and is transmitted to port P5 of first information processor 30. In detection port information receiver 71, the detection port information is received.

Right after transmission of port detection packet, bubble packet transmitter 13 transmits the bubble packet to port sPort of second information-processor 40. This bubble packet is transmitted from port P6 of first information processor 30. Herein, port P6 is a different port from port P5, and is a port newly assigned in first information processor 30 at the time of transmission of bubble packet.

Right after transmission of bubble packet, detection packet transmitter 14 transmits again the port detection packet to port P11 of port detection server 51. The port detection packet is transmitted from port P7 of first information processor 30. Herein, port P7 is a different port from port P5 or port P6, and is a port newly assigned in first information processor 30 at the time of transmission of port detection packet. This port detection packet is received in port detection server 51. Same as in the case of first port detection packet, the detection port information is transmitted from port detection server 51 to first information processor 30.

Detection port information receiver 71 of first information processor 30 receives this detection port information, and judges if the positions of ports of communication control unit 3 used in transmission of two port detection packets and the bubble packet transmitting port are consecutive or not. This is judged by checking whether the difference of port P10 and port P8 is equal or not to 2 times of the port number differential of communication control unit 3 detected at step S801. When the difference of port P10 and port P8 is equal to 2 times of the port number differential of communication control unit 3, bubble packet transmitting port detector 72 judges that the positions of ports of communication control unit 3 used in transmission of two port detection packets and the bubble packet transmitting port are consecutive, and judging that the bubble packet transmitting port can be detected (step S807), and the middle port number of port number of port P8 and port number of port P10 is detected as the position of bubble packet transmitting port (step S808). Bubble packet transmitting port detector 72 transfers the position of the detected bubble packet transmitting port to SIP processor 31.

SIP processor 31 transmits the communication request including the position of the bubble packet transmitting port and the global side address of communication control unit 3 again to SIP server 52 (step S809). This communication request is also called INVITE request, including the device ID of first information processor 30 and device ID of second information processor 40. The communication request is relayed in SIP server 52, and is transmitted to second information processor 40 (step S810). This communication is also done through ports P1 to P4.

Second information processor 40, receiving this communication request, obtains the knowledge of IP address of sending/calling side and position of receiving port. Second information processor 40 transmits the response to communication request to SIP server 52 (step S811). This response also includes the device ID of first information processor 30 and second information processor 40. The response is relayed through SIP server 52, and is transmitted to first information processor 30 by way of port P2 of communication control unit 3 (step S812).

Figure 31:
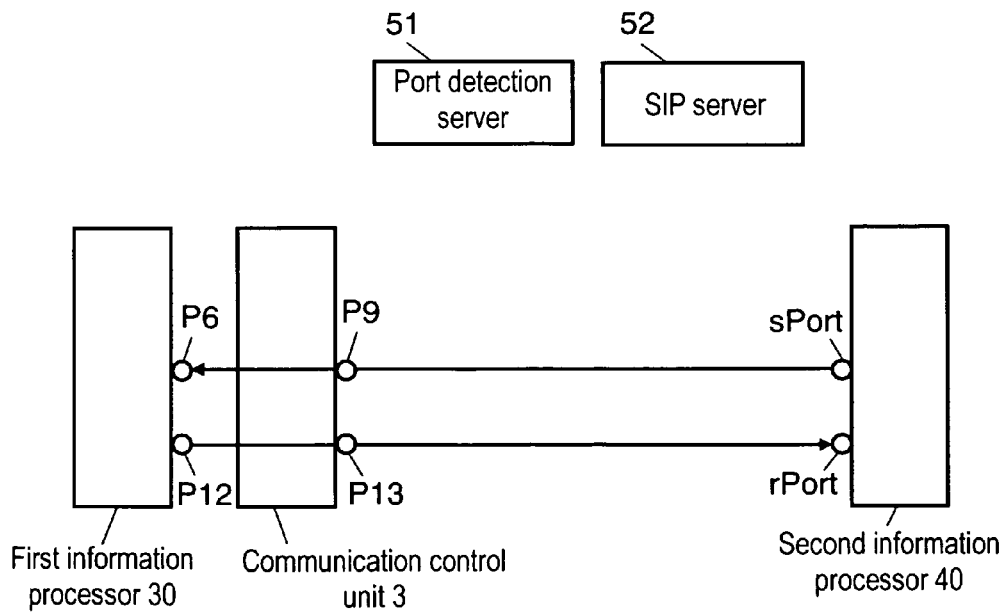
FIG. 31 is an explanatory diagram of specific example in the preferred embodiment.
Figures 32, 33:
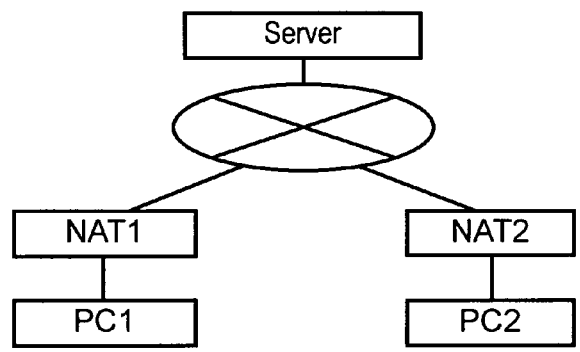
FIG. 32 is an explanatory diagram of characteristics (types) of NAT.
FIG. 33 is a diagram showing an example of communication system.

To response from communication partner side, confirmation to response is transmitted by way of SIP server 52 (steps S813, S814). This transmission of confirmation is known as ACK. Later, as shown in FIG. 31, first information processor 30 transmits the information to port rPort of second information processor 40, and second information processor 40 transmits the information to port P9 of communication control unit 3. The information transmitted to port P9 of communication control unit 3 is converted in address in communication control unit 3, and is transmitted to port P6 of first information processor 30. Thus, communication is established between first information processor 30 and second information processor 40, and it is possible to communicate between the two.

In this preferred embodiment, as explained by using the sequence shown in FIG. 29, the sequence for establishing communications between information processors is not limited to the one shown in FIG. 29 alone. For example, in transmission of response at step S811, the information showing the IP address of second information processor 40, and the information shoring the position of receiving port may be transmitted to first information processor 30 by way of SIP server 52. In this case, first information processor 30 makes use of the information transmitted through SIP server 52, and communication between first information processor 30 and second information processor 40 is established. The IP address of second information processor 40 transmitted at step S811 is same as that transmitted at step S804. Second information processor 40 uses the transmitting port indicated by communication destination information transmitted at step S804 as the transmitting port in communication with first information processor 30.

According to the communication system of the preferred embodiment, by using the technique of detecting the position of bubble packet transmitting port explained in preferred embodiments 1 to 3, communication between information processors can be established by the SIP regardless of the type of NAT of communication control unit 3. This detecting method of position of bubble packet transmitting port may be applied also in other than the system or sequence explained in preferred embodiments 1 to 3.

In the preferred embodiment, the port number differential of communication control unit 3, and the position of bubble packet transmitting port are detected at the client side, but same as in preferred embodiment 1, any one or more of these processes may be executed at the server side.

In the preferred embodiment, port detection server 51 and SIP server 52 are individually provided, but they may be realized by one server.

In the preferred embodiment, communication between information processors is established by using the SIP, but other protocol may be used for establishing communication between information processors. In such a case, too, by using port detection server 51, the position of bubble packet transmitting port can be detected, and it is possible to communication by way of communication control unit having NAT function.

For example, as explained in preferred embodiment 4, in the foregoing preferred embodiments, the communication system may be a communication system comprising information processors for transmitting bubble packet, and servers for processing to detect the position of bubble packet transmitting port, and it may be intended to detect the position of bubble packet transmitting port. That is, the communication system of the invention may be realized by the following communication system. This communication system is a communication system comprising an information processor, a communication control unit for controlling the communication of the information processor, and a server, and the information processor includes a bubble packet transmitter for transmitting a bubble packet for leaving transmission record in the communication control unit by way of the communication control unit, and a detection packet transmitter for transmitting a port detection packet used in detection of position of bubble packet transmitting port as the port of the communication control unit used in transmission of the bubble packet, to the server, before and after transmission of the bubble packet by the bubble packet transmitter, and the server includes a bubble packet transmitting port detector for receiving the port detection packet transmitted from the information processor, and detecting the position of the bubble packet transmitting port on the basis of the port detection packet. In this communication system, the position of bubble packet transmitting port detected by the server may be transmitted to the information processor by the transmitter, or may be transferred to the information processor by other method. Other method includes, for example, a method of recording the information showing the position of bubble packet transmitting port in a recording medium, and reading out the information from the recording medium by the information processor, or a method of displaying the information showing the position of bubble packet transmitting port in the server, and allowing the user to see the display and enter the information showing the range of ports in the information processor.

For example, as explained in preferred embodiment 4, in the foregoing preferred embodiments, the communication system may be a communication system comprising information processors for transmitting bubble packet, and servers for processing to detect the position of bubble packet transmitting port, and it may be intended to detect the position of bubble packet transmitting port. That is, the communication system of the invention may be realized by the following communication system. This communication system is a communication system comprising an information processor, a communication control unit for controlling the communication of the information processor, and a server, and the information processor includes a bubble packet transmitter for transmitting a bubble packet for leaving transmission record in the communication control unit by way of the communication control unit, a detection packet transmitter for transmitting a port detection packet used in detection of position of bubble packet transmitting port as the port of the communication control unit used in transmission of the bubble packet, to the server, before and after transmission of the bubble packet by the bubble packet transmitter, a detection port information receiver for receiving the detection port information showing the position of the port of the communication control unit allowing to pass the port detection packet, and a bubble packet transmitting port detector for detecting the position of the bubble packet transmitting port on the basis of the detection port information received in the detection port information receiver, and the server includes a detector for detecting port number for receiving the port detection packet, and detecting the position of the port of the communication control unit allowing to pass the port detection packet, and a port number information transmitter for port differential detection for transmitting the detection port information showing the position of the port detected by the detector for detecting port number to the information processor. Thus, the position of the bubble packet transmitting port may be detected in the information processor, instead of the server. In this communication system, the position of bubble packet transmitting port detected in the information processor may be transmitted to the information processor by the transmitter, or may be transferred to the information processor by other method. Other method includes, for example, a method of recording the information showing the position of bubble packet transmitting port in a recording medium, and reading out the information from the recording medium by the information processor, or a method of displaying the information showing the position of bubble packet transmitting port in the information processor, and allowing the user to see the display and enter the information showing the position of the bubble packet transmitting port in other information processor.

In the foregoing embodiments, each information processor is connected to communication network 5 by way of one communication control unit, but communications between information processors can be established even in the case of connected to communication network 5 by way of plural communication control units (that is, multi-stage connection NAT).

In the preferred embodiments, first communication control unit 3 and second communication control unit 4 have the NAT function, but first communication control unit 3 and second communication control unit 4 may have, instead of the NAT function, or together with the NAT function, firewall function of packet filtering. The packet filtering is to select the reception packet on the basis of, for example, the reception filter rule. When first communication control unit 3 has the firewall function on the basis of such reception filter rule, by leaving the transmission record in first communication control unit 3 by transmission of bubble packet from the local side (first information processor 1, etc. side) to the global side (communication network 5), the reply packet transmitted to bubble packet transmitting port may be received. Or when second communication control unit 4 has the fire wall function on the basis of such reception filter rule, by transmission of reply packet from the local side (second information processor 2, etc. side) to the global side by way of the target port for transmitting bubble packet, communication is established between first information processor 1, etc. and second information processor 2, etc.

Herein, the first information processor and second information processor may or may not support the firewall function as application.

In the preferred embodiments, server 6 or the like is specified by the IP address, but server 6 or the like may be specified by domain name (for example, server.pana.net or the like). In this case, the domain name is converted into IP address by using the DNS server, and server 6 or the like can be specified.

The protocol used in communication in the preferred embodiments may be either IPv4 (Internet protocol version 4) or IPv6 (Internet protocol version 6).

In the preferred embodiments, each process (each function) may be realized by concentrated processing by a single device (system), or realized by discrete processing by plural devices.

In the preferred embodiments, the communication requesting side is explained as the bubble packet transmitting side, but the communication request receiving side may be the bubble packet transmitting side.

In the preferred embodiments, the constituent elements may be composed of exclusive hardware, or constituent elements that can be realized by the software may be realized by the software by program control. The software for realizing the information processor in the preferred embodiments may include the following program. That is, the program is a program for executing the process in the first information processor for communicating with the second information processor, by way of the first communication control unit for controlling the communication of the first information processor and the second communication control unit for controlling the communication of the second information processor, and is intended to execute a reference port receiving step of receiving the reference port information showing the position of the reference port as the port in the second communication control unit as the reference of target of transmission of bubble packet transmitted for leaving transmission record in the first communication control unit, a bubble packet transmitting step of transmitting the bubble packet to the second communication control unit by way of the first communication control unit, a detection packet transmitting step of transmitting the port detection packet for detecting the position of the bubble packet transmitting port as the port of the first communication unit used in transmission of the bubble packet, and a reply packet receiving step of receiving the reply packet transmitted to the bubble packet transmitting port from the second information processor by way of the second communication control unit.

In this program, the reference port may be the latest port at the moment of transmission of the reference port detection packet for detecting the position of the reference port from the second information processor, out of the ports assigned in the second communication control unit.

In this program, at the detection packet transmitting step, the port detection packet may be transmitted before and after transmission of bubble packet at the bubble packet transmitting step.

In this program, the bubble packet and port detection packet may be transmitted by using different ports in the first communication control unit.

In this program, the bubble packet and port detection packet may be transmitted by using newly assigned ports in the first communication control unit.

In this program, the computer may further execute a re-send instruction receiving step of receiving a re-send instruction for re-sending the bubble packet and port detection packet, and the detection packet transmitting packet may be characterized by re-sending the port detection packet when receiving the re-send instruction at the re-send instruction receiving step, at the detection packet transmitting step, and re-sending the bubble packet when receiving the re-send instruction at the re-send instruction receiving step, at the bubble packet transmitting step.

In this program, the computer may further execute a port number differential detection packet transmitting system for transmitting a port number differential detection packet for detecting the port number differential in the first communication control unit by way of the first communication control unit.

In this program, the bubble packet transmitting target port as the port of target of transmission of bubble packet in the second communication control unit may be a port assigned after assignment of specified ports from the reference port.

In this program, the computer may further execute a port number differential receiving step of receiving the port number differential information as the information showing the port number differential in the second communication control unit, and the bubble packet transmitting step may be characterized by transmitting the bubble packet to the bubble packet transmitting target port of which port interval from the reference port is M times (M being an integer of 1 or more) of the port number differential indicated by the port number differential information.

In this program, the computer may further execute a re-reply packet transmitting step of transmitting a re-reply packet to the port of the second communication control unit used in transmission of the reply packet when the reply packet is received at the reply packet receiving step.

In the program, the computer may further execute a port differential information receiving step of receiving the port differential information showing the position of the port of the first communication control unit allowing to pass the port detection packet, a bubble packet transmitting port detecting step of detecting the position of the bubble packet transmitting port on the basis of the port differential information received at the port differential information receiving step, and a bubble packet transmitting port transmitting step of transmitting the bubble packet transmitting port information showing the position of the bubble packet transmitting port detected at the bubble packet transmitting port detecting step.

In this program, at the detection packet transmitting step, if the position of the bubble packet transmitting port cannot be detected by the bubble packet transmitting port detecting step, the port detection packet may be transmitted again, or at the bubble packet transmitting step, if the position of the bubble packet transmitting port cannot be detected at the bubble packet transmitting port detecting step, the bubble packet may be transmitted again.

In the program, the computer may further execute a port number differential detection packet transmitting step of transmitting a port number differential detection packet for detecting the port number differential in the first communication control unit by way of the first communication control unit, as port differential information receiving step of receiving the port differential information showing the position of the port of the first communication control unit allowing to pass the port number differential detection packet, and a port number differential detecting step of detecting the port number differential in the first communication control unit on the basis of the port differential information received in the port differential information receiver, and the bubble packet transmitting port detecting step may be characterized by detecting the position of the bubble packet transmitting port by using the port number differential in the first communication control unit detected at the port number differential detecting step.

The software for realizing the information processor in the preferred embodiments is the following program. That is, the program is a program for executing the process in the first information processor for communicating with the second information processor, by way of the first communication control unit for controlling the communication of the first information processor and the second communication control unit for controlling the communication of the second information processor, in which the first communication control unit receives the bubble packet for leaving the transmission record in the second communication control unit, from the second information processor by way of the second communication control unit, and executes a reference port detection packet transmitting step of transmitting a reference port detection packet for detecting the position of the reference port as the port in the first communication control unit as the reference of target of transmission of bubble packet, a bubble packet transmitting port receiving step of receiving the bubble packet transmitting port information showing the position of the bubble packet transmitting port as the port of the second communication control unit used in transmission of the bubble packet from the second information processor, and a reply packet transmitting step of transmitting a reply packet to the bubble packet transmitting port indicated by the bubble packet transmitting port information.

In this program, at the reply packet transmitting step, the reply packet may be transmitted by using N (N being an integer of 2 or more) different ports of the first communication control unit.

In this program, N ports may be assigned newly in the first communication control unit at the time of transmission of the reply packet.

In the program, the number N may be grater than the number of ports that can be assigned from the reference port to the port used for transmitting the bubble packet in the first communication control unit.

In this program, the computer may further execute a re-reply packet receiving step of receiving the re-reply packet transmitted from the second information processor to the port of the first communication control unit used in transmission of the reply packet.

In the program, the computer may also execute a port number differential detection packet transmitting step of transmitting the port number differential detection packet for detecting the port number differential in the first communication control unit by way of the first communication control unit.

In the program, the computer may also execute a port differential information receiving step of receiving the port differential information showing the position of the port of the first communication control unit allowing to pass the port number differential detection packet, a port number differential detecting step of detecting the port number differential in the first communication control unit on the basis of the port differential information received at the port differential information receiving step, and a port number differential transmitting step of transmitting the port differential information as the information showing the port number differential in the first communication control unit detected at the port number differential detecting step.

The software for realizing the server in the preferred embodiments is the following program. That is, the program is a program for executing the process in the server for establishing communication between the first information processor and second information processor, by way of the first communication control unit for controlling the communication of the first information processor and the second communication control unit for controlling the communication of the second information processor, and is intended to execute a reference port detecting step of receiving a reference port detection packet transmitted from the second information processor by way of the second communication control unit in order to detect the position of the reference port as the port in the second communication control unit as the reference of target of transmission of bubble packet transmitted by the first information processor for leaving the transmission record in the first communication control unit, and detecting the position of the reference port on the basis of the reference port detection packet, a reference port transmitting step of transmitting the reference port information showing the position of the reference port detected at the reference port detecting step to the first information processor, a bubble packet transmitting step of receiving a port detection packet transmitted from the first information processor in order to detect the position of the bubble packet transmitting port as the port in the first communication control unit used in transmission of the bubble packet from the first information processor to the second communication control unit, and detecting the position of the bubble packet transmitting port on the basis of the port detection packet, and a bubble packet transmitting port transmitting step of transmitting the bubble packet transmitting port information showing the position of the bubble packet transmitting port detected at the bubble packet transmitting port detecting step to the second information processor.

In this program, the computer may further execute a re-send instruction transmitting step of transmitting a re-send instruction for re-sending the bubble packet and port detection packet to the first information processor if the position of the bubble packet transmitting port cannot be detected at the bubble packet transmitting port detecting step.

In this program, at the bubble packet transmitting port detecting step, receiving the port detection packets transmitted before and after transmission of the bubble packet, the two ports in the first communication control unit used in transmission of the port detection packets and the bubble port transmitting port are judged if consecutive or not, and if consecutive, the position of the port enclosed by the two ports may be detected as the position of the bubble packet transmitting port.

In this program, at the bubble packet transmitting port detecting step, the ports may be judged to be consecutive if the interval of two ports in the first communication control unit used in transmission of the port detection packets is 2 times of the port number differential in the first communication control unit.

In this program, the computer may further execute a first port number differential detecting step of receiving a first port number differential detection packet transmitted from the first information processor by way of the first communication control unit, and detecting the port number differential in the first communication control unit on the basis of the first port number differential detection packet, and the bubble packet transmitting port detecting step may be characterized by judging by using the port number differential detected at the first port number differential detecting step.

In this program, the computer may further execute a second port number differential detecting step of receiving a second port number differential detection packet transmitted from the second information processor by way of the second communication control unit, and detecting the port number differential in the second communication control unit on the basis of the second port number differential detection packet, and a port number differential transmitting step of transmitting the port differential information as the information showing the port number differential detected at the second port number differential detecting step to the first information processor.

The software for realizing the information processor in the preferred embodiments is the following program. That is, the program is a program for causing the computer to execute the process in the server for establishing communication between the first information processor and second information processor, by way of the first communication control unit for controlling the communication of the first information processor and the second communication control unit for controlling the communication of the second information processor, and is intended to execute a reference port detecting step of receiving a reference port detection packet transmitted from the second information processor by way of the second communication control unit in order to detect the position of the reference port as the port in the second communication control unit as the reference of target of transmission of bubble packet transmitted by the first information processor for leaving the transmission record in the first communication control unit, and detecting the position of the reference port on the basis of the reference port detection packet, a reference port transmitting step of transmitting the reference port information showing the position of the reference port detected at the reference port detecting step to the first information processor, a detection port detecting step of receiving a port detection packet transmitted from the first information processor in order to detect the position of the bubble packet transmitting port as the port in the first communication control unit used in transmission of the bubble packet from the first information processor to the second communication control unit, and detecting the position of the port of the first communication control unit allowing to pass the port detection packet on the basis of the port detection packet, and a port differential information transmitting step of transmitting the port differential information showing the position of the port detected at the detection port detecting step to the first information processor.

The software for realizing the server in the preferred embodiments is the following program. That is, the program is a program for causing the computer to execute the process in an information processor for composing a communication system comprising an information processor, a communication control unit for controlling the communication of the information processor, and a server, and is intended to execute a bubble packet transmitting step of transmitting a bubble packet for leaving the transmission record in the communication control unit by way of the communication control unit, and a detection packet transmitting step of transmitting port detection packets used for detecting the position of the bubble packet transmitting port as the port in the communication control used in transmission of the bubble packet, to the server, before and after transmission of the bubble packet at the bubble packet transmitting step.

The software for realizing the server in the preferred embodiments is the following program. That is, the program is a program for causing the computer to execute the process in a server for composing a communication system comprising an information processor, a communication control unit for controlling the communication of the information processor, and a server, and is intended to execute a step of receiving port detection packets transmitted from the information processor before and after transmission of bubble packet in order to detect the position of the bubble packet transmitting port as the port in the communication control used in transmission of the bubble packet transmitted by the information processor for leaving the transmission record in the communication control unit, and a step of detecting the position of the bubble packet transmitting port on the basis of the port detection packet.

The software for realizing the server in the preferred embodiments is the following program. That is, the program is a program for causing the computer to execute the process in a server for composing a communication system comprising an information processor, a communication control unit for controlling the communication of the information processor, and a server, and is intended to execute a step of receiving port detection packets transmitted from the information processor before and after transmission of bubble packet in order to detect the position of the bubble packet transmitting port as the port in the communication control used in transmission of the bubble packet transmitted by the information processor for leaving the transmission record in the communication control unit, a step of detecting the position of the port of the communication control unit allowing to pass the port detection packet, and a step of transmitting port differential information showing the position of the port of the communication control unit allowing to pass the e port detection packet to the information processor.

In these programs, in the transmitting step of transmitting information or in the receiving step of receiving information, the process executed in the hardware, such as the process conducted in the modem or interface card at the transmitting step (the process executed only in the hardware) is not included.

The program may be distributed by downloading from the server or the like, or may be distributed by recording from a specified recording medium (for example, optical disk such as CD-ROM or magnetic disk, semiconductor memory, etc.).

The computer for executing the program may be either one or plural. That is, either concentrated process or discrete process may be applied.

INDUSTRIAL APPLICABILITY

As described herein, in the communication system and others by the invention, communication can be established between plural information processors by way of a communication control unit, and it is very useful for communication between information processors.

The invention claimed is:

1. A communication system comprising a first information processor, a second information processor, a first communication control unit for controlling the communication of the first information processor, a second communication control unit for controlling the communication of the second information processor, and a server for establishing communication between the first information processor and the second information processor, wherein the first information processor includes:
a memory;
a reference port receiver for receiving reference port information from the server identifying a reference port number of the second communication control unit, the reference port number being a reference for transmission of a bubble packet transmitted for leaving a transmission record in the first communication control unit;

a bubble packet transmitter for transmitting the bubble packet to a single destination bubble packet transmitting port of the second communication control unit via the first communication control unit in accordance with the reference port number;

a detection packet transmitter for transmitting a port detection packet used to identify a number of a bubble packet transmitting port of the first communication control unit, which is used in transmission of the bubble packet; and a reply packet receiver for receiving reply packets transmitted from the second information processor via the second communication control unit to the bubble packet transmitting port, and the second information processor includes:

a memory;

a reference port detection packet transmitter for transmitting a reference port detection packet to the server for identifying the number of the reference port;

a bubble packet transmitting port information receiver for receiving bubble packet transmitting port information from the server identifying the number of the bubble packet transmitting port; and a reply packet transmitter for transmitting a plurality of reply packets to the bubble packet transmitting port which is identified by the bubble packet transmitting port number via a plurality of reply packet transmitting ports of the second communication control unit, the plurality of reply packet transmitting ports including the destination bubble packet transmitting port, and the server includes:

a memory;

a reference port detector which receives the reference port detection packet transmitted from the second information processor for detecting the number of the reference port in accordance with the reference port detection packet;

a reference port transmitter for transmitting reference port information identifying the number of the reference port detected by the reference port detector to the first information processor;

a bubble packet transmitting port detector which receives the port detection packet transmitted from the first information processor for detecting the number of the bubble packet transmitting port in accordance with the port detection packet; and a bubble packet transmitting port transmitter for transmitting the number of the bubble packet transmitting port to the second information processor.

2. The communication system of claim 1, wherein the detection packet transmitter transmits the port detection packet in the first information processor before and/or after the bubble packet transmitter transmits the bubble packet.

3. The communication system of claim 1 or 2, wherein the bubble packet transmitting port detector identifies the number of the bubble packet transmitting port by using a port number differential of the first communication control unit in the server.

4. The communication system of claim 2, wherein the first information processor further includes:

a port number differential detection packet transmitter for transmitting a port number differential detection packet for detecting a port number differential in the first communication control unit via the first communication control unit, and the server further includes:

a port number differential detector which receives the port number differential detection packet for detecting the port number differential of the first communication control unit in accordance with the port number differential detection packet, and the bubble packet transmitting port detector identifies the number of the bubble packet transmitting port by using the port number differential detected by the port number differential detector.

5. The communication system of claim 1, wherein the first information processor further includes:

a port number differential detection packet transmitter for transmitting a port number differential detection packet for detecting a port number differential in the first communication control unit via the first communication control unit, and the server further includes:

a port number differential detector which receives the port number differential detection packet for detecting the port number differential of the first communication control unit in accordance with the port number differential detection packet, and the bubble packet transmitting port detector identifies the number of the bubble packet transmitting port by using the port number differential detected by the port number differential detector.

6. The communication system of claim 1, wherein the plurality of reply packet transmitting ports are newly assigned in the second communication control unit when transmitting the reply packet.

7. The communication system of claim 1, wherein the bubble packet transmitter transmits the bubble packet to a port which is assigned based on the reference port and a specified number L (L being an integer).

8. The communication system of claim 7, wherein a number of the plurality of reply packet transmitting ports is greater than or equal to the number L.

9. The communication system of claim 1, wherein the bubble packet transmitting port is a single port, and the plurality of reply packets are transmitted to the single bubble packet transmitting port via the plurality of reply packet transmitting ports.

10. The communication system of claim 1, wherein a port number of the destination bubble packet port is determined based on the port number of the reference port.

11. A server for establishing communication between a first information processor and a second information processor via a first communication control unit for controlling the communication of the first information processor and a second communication control unit for controlling the communication of the second information processor, comprising:

a memory;

a reference port detector which receives a reference port detection packet transmitted from the second information processor via the second communication control unit for identifying a reference port number in the second communication control unit, the reference port number being a reference for transmission of a bubble packet transmitted by the first information processor for leaving a transmission record in the first communication control unit;

a reference port transmitter for transmitting reference port information identifying the position of the reference port detected by the reference port detector to the first information processor;

a bubble packet transmitting port detector which receives a port detection packet transmitted from the first information processor for identifying a number of a bubble packet transmitting port in accordance with the port detection packet in order to identify the number of the bubble packet transmitting port, the bubble packet transmitting port being in the first communication control unit, which is used in transmission of the bubble packet from the first information processor to a single destination bubble packet transmitting port of the second communication control unit; and a bubble packet transmitting port information transmitter for transmitting bubble packet transmitting port information identifying the number of the bubble packet transmitting port detected by the bubble packet transmitting port detector to the second information processor, wherein, responsive to receiving the bubble packet transmitting port information, the second information processor transmits a plurality of reply packets to the bubble packet transmitting port which is identified by the bubble packet transmitting port number via a plurality of reply packet transmitting ports of the second communication control unit, the plurality of reply packet transmitting ports including the destination bubble packet transmitting port.

12. The server of claim 11, wherein the bubble packet transmitting port detector identifies the number of the bubble packet transmitting port by using a port number differential of the first communication control unit.

13. The server of claim 12, further comprising:

a port number differential detector which receives a port number differential detection packet transmitted from the first information processor for detecting the port number differential of the first communication control unit in accordance with the port number differential detection packet in order to detect the port number differential of the first communication control unit, wherein the bubble packet transmitting port identifies the number of the bubble packet transmitting port by using the port number differential detected by the port number differential detector.

14. The server of claim 11, further comprising:

a port number differential detector which receives a port number differential detection packet transmitted from the first information processor for detecting a port number differential of the first communication control unit in accordance with the port number differential detection packet in order to detect the port number differential of the first communication control unit, wherein the bubble packet transmitting port identifies the number of the bubble packet transmitting port by using the port number differential detected by the port number differential detector.

15. The server of claim 11, wherein the plurality of reply packet transmitting ports are newly assigned in the second communication control unit when transmitting the reply packet.

16. The server of claim 11, wherein the first information processor transmits the bubble packet to a port which is assigned based on the reference port and a specified number L (L being an integer).

17. The server of claim 16, wherein a number of the plurality of reply packet transmitting ports is greater than or equal to the number L.

18. A communication method used for a server in a communication system including a first information processor, a first communication control unit for controlling the communication of the first information processor, a second information processor, a second communication control unit for controlling the communication of the second information processor, and the server, comprising:

receiving a reference port detection packet transmitted from the second information processor via the second communication control unit and identifying a number of a reference port in the second communication control unit, the reference port being a reference for transmission of a bubble packet transmitted by the first information processor for leaving a transmission record in the first communication control unit;

transmitting reference port information identifying the number of the reference port detected in the reference port detecting step to the first information processor;

receiving a port detection packet transmitted from the first information processor in order to identify a number of a bubble packet transmitting port of the first communication control unit, which is used in transmission of the bubble packet from the first information processor to a single destination bubble packet transmitting port of the second communication control unit;

detecting the number of the bubble packet transmitting port in accordance with the port detection packet; and transmitting bubble packet transmitting port information identifying the number of the bubble packet transmitting port detected to the second information processor, wherein, responsive to receiving the bubble packet transmitting port information, the second information processor transmits a plurality of reply packets to the bubble packet transmitting port which is identified by the bubble packet transmitting port number via a plurality of reply packet transmitting ports of the second communication control unit, the plurality of reply packet transmitting ports including the single destination bubble packet transmitting port.

19. The communication method of claim 18, further comprising:

detecting a port number of the first communication control unit through which the port detection packet has passed in accordance with the port detection packet; and transmitting detecting port information identifying the port number detected in the detecting port detecting step.

20. The communication method of claim 18, wherein the plurality of reply packet transmitting ports are newly assigned in the second communication control unit when transmitting the reply packet.

21. The communication method of claim 18, wherein the first information processor transmits the bubble packet to a port which is assigned based on the reference port and a specified number L (L being an integer).

22. The communication method of claim 21, wherein a number of the plurality of reply packet transmitting ports is greater than or equal to the number L.

* * * * *